US011174629B2

(12) United States Patent
Dixon

(10) Patent No.: US 11,174,629 B2
(45) Date of Patent: Nov. 16, 2021

(54) BLAST RESISTANT SHELTER AND METHOD OF ASSEMBLY

(71) Applicant: SOUTHERN COMFORT SHELTERS, INC., Zachary, LA (US)

(72) Inventor: Robert C. Dixon, Denham Springs, LA (US)

(73) Assignee: SOUTHERN COMFORT SHELTERS, INC., Zachary, LA (US)

( * ) Notice: Subject to any disclaimer, the term of this patent is extended or adjusted under 35 U.S.C. 154(b) by 190 days.

(21) Appl. No.: 16/269,169

(22) Filed: Feb. 6, 2019

(65) Prior Publication Data

US 2019/0169833 A1 Jun. 6, 2019

Related U.S. Application Data

(63) Continuation of application No. 15/674,741, filed on Aug. 11, 2017, now Pat. No. 10,260,229.

(Continued)

(51) Int. Cl.

*E04B 1/344* (2006.01)
*E04H 9/10* (2006.01)

(Continued)

(52) U.S. Cl.

CPC .............. *E04B 1/3448* (2013.01); *E04B 1/19* (2013.01); *E04B 1/24* (2013.01); *E04B 1/3205* (2013.01);

(Continued)

(58) Field of Classification Search

None

See application file for complete search history.

(56) References Cited

U.S. PATENT DOCUMENTS 752,348 A 2/1904 Lutts
2,084,818 A * 6/1937 Neil .................... G09F 15/0006 40/613

(Continued)

FOREIGN PATENT DOCUMENTS

EP 2669443 A1 12/2013
GB 2278376 A 11/1994

OTHER PUBLICATIONS

International Search Report and Written Opinion issued by the United States International Searching Authority regarding International Application No. PCT/US2018/027048, dated Jul. 27, 2018, 13 pages.

(Continued)

*Primary Examiner* — Babajide A Demuren
*Assistant Examiner* — Adam G Barlow
(74) *Attorney, Agent, or Firm* — Haynes and Boone, LLP

(57) ABSTRACT

A method and apparatus according to which a blast resistant shelter is assembled. The blast resistant shelter includes first and second structural members, a third structural member coupled to the first and second structural members, a first airway adjacent the third structural member, and a first blast panel pivotably mounted to the third structural member and adapted to pivot thereabout in response to a blast wave. In a first configuration, the first blast panel is detachably connected to a first portion of the blast resistant shelter and prevented from pivoting about the third structural member so that the first blast panel obstructs air flow through the first airway. In a second configuration, in response to the blast wave, the first blast panel is detached from the first portion of the blast resistant shelter and permitted to pivot about the third structural member to permit air flow through the first airway.

12 Claims, 16 Drawing Sheets

14
16
10
18b
12
20b
20a
18a

Related U.S. Application Data

(60) Provisional application No. 62/484,482, filed on Apr. 12, 2017.

(51) Int. Cl.

| | |
|---|---|
| ***E04B 1/98*** | (2006.01) |
| ***E04B 1/19*** | (2006.01) |
| ***E04B 1/24*** | (2006.01) |
| ***E04B 1/32*** | (2006.01) |
| ***E04B 1/342*** | (2006.01) |
| ***E04B 1/92*** | (2006.01) |
| ***E04H 9/04*** | (2006.01) |
| *E04F 13/00* | (2006.01) |

(52) U.S. Cl.

CPC ................ *E04B 1/342* (2013.01); *E04B 1/92* (2013.01); *E04B 1/98* (2013.01); *E04H 9/04* (2013.01); *E04H 9/10* (2013.01); *E04B 2001/199* (2013.01); *E04B 2001/3252* (2013.01); *E04F 13/002* (2013.01); *Y02A 50/00* (2018.01)

(56) References Cited

U.S. PATENT DOCUMENTS 2,337,785 A * 12/1943 Thurman ................ E04F 10/10 160/60
2,544,500 A * 3/1951 Jacobi ................... E05F 1/1058 267/173
2,877,840 A * 3/1959 Hurowitz .............. E06B 3/2605 160/91
3,341,990 A * 9/1967 Mouton, Jr. .............. E04C 3/40 52/86
4,483,102 A * 11/1984 Edwards ................... E06B 9/04 454/259
4,503,631 A * 3/1985 Kelly ........................ G09F 7/22 40/602
4,700,511 A 10/1987 Minialoff et al.
4,910,898 A * 3/1990 Hector ...................... E01F 9/65 40/479
5,042,182 A * 8/1991 King ................... G09F 15/0025 40/603
5,271,189 A 12/1993 Vincent et al.
5,737,874 A * 4/1998 Sipos ........................ E06B 9/02 49/63
5,907,929 A * 6/1999 Poma ...................... E06B 7/082 52/78
6,202,363 B1 * 3/2001 Chang ..................... E04B 7/163 160/22
6,223,473 B1 * 5/2001 Romig ...................... E04B 1/98 52/1
6,481,167 B2 * 11/2002 Liddell ................... E06B 7/086 52/198
6,536,174 B2 * 3/2003 Foster ....................... E06B 9/02 49/463
7,380,379 B2 6/2008 Venegas, Jr.
7,694,482 B2 * 4/2010 Gazaway .................. E06B 9/38 52/473
8,015,769 B2 * 9/2011 Crostic, Jr. ......... E04G 21/3266 52/407.4
8,136,298 B1 * 3/2012 Johnston ................ E04F 10/10 49/64
8,371,073 B2 * 2/2013 Fuller ..................... E04F 17/00 52/80.1
8,375,634 B2 * 2/2013 Brandley ................ E06B 7/096 49/73.1
9,279,265 B1 * 3/2016 Nead ......................... E04H 9/10
2004/0025453 A1 * 2/2004 Coddens ................... E06B 5/12 52/202
2004/0035056 A1 * 2/2004 Briscoe ..................... E06B 9/02 49/67
2005/0022452 A1 * 2/2005 Schlossbauer ............ E04B 2/88 49/67
2006/0254102 A1 * 11/2006 Mayants ................... G09F 7/22 40/602
2009/0320388 A1 * 12/2009 Lilli .......................... E04B 2/88 52/173.3
2010/0126545 A1 * 5/2010 Bullivant ................ E04H 15/36 135/125
2011/0011009 A1 * 1/2011 Claerhout ................. E06B 9/36 52/63
2011/0023759 A1 * 2/2011 Waller ...................... F41H 5/24 109/79
2013/0283656 A1 * 10/2013 Melic .................. G09F 15/0087 40/602
2016/0281349 A1 * 9/2016 Kasanen ................. E04H 15/18

OTHER PUBLICATIONS

Non Final Office Action issued in U.S. Appl. No. 15/674,741, dated Feb. 22, 2018, 12 pages.

Final Office Action issued in U.S. Appl. No. 15/674,741, dated Aug. 31, 2018, 12 pages.

Notice of Allowance issued in U.S. Appl. No. 15/674,741, dated Dec. 3, 2018, 8 pages.

* cited by examiner

BLAST RESISTANT SHELTER AND METHOD OF ASSEMBLY

CROSS-REFERENCE TO RELATED APPLICATIONS

This application is a continuation of U.S. application Ser. No. 15/674,741, filed Aug. 11, 2017, which claims the benefit of the filing date of, and priority to, U.S. Application No. 62/484,482, filed Apr. 12, 2017, the entire disclosures of which are hereby incorporated herein by reference.

TECHNICAL FIELD

This disclosure relates in general to shelters used to accommodate personnel at or near a process unit during a turnaround and, in particular, to a blast resistant shelter and method of assembly.

BACKGROUND

A shelter may include a canopy draped over, and coupled to, a frame. If such a shelter is to be used to accommodate personnel at or near a process unit during a turnaround, it must comply with industry standards such as, for example, the American Petroleum Institute's ("API") Recommended Practice 756. Such industry standards require the shelter to withstand structural loads that could be imparted by a blast wave emanating from the process unit. Failure to comply with the API's Recommended Practice 756 may result in excessive loading imparted on the frame of the shelter by the blast wave. In severe cases, this excessive loading on the frame may cause significant structural damage or collapse. Moreover, this excessive loading on the frame may necessitate costly additional anchoring of the frame. Therefore, what is needed is an assembly, apparatus, or method that addresses one or more of the foregoing issues, and/or other issues.

DETAILED DESCRIPTION

Figure 1:
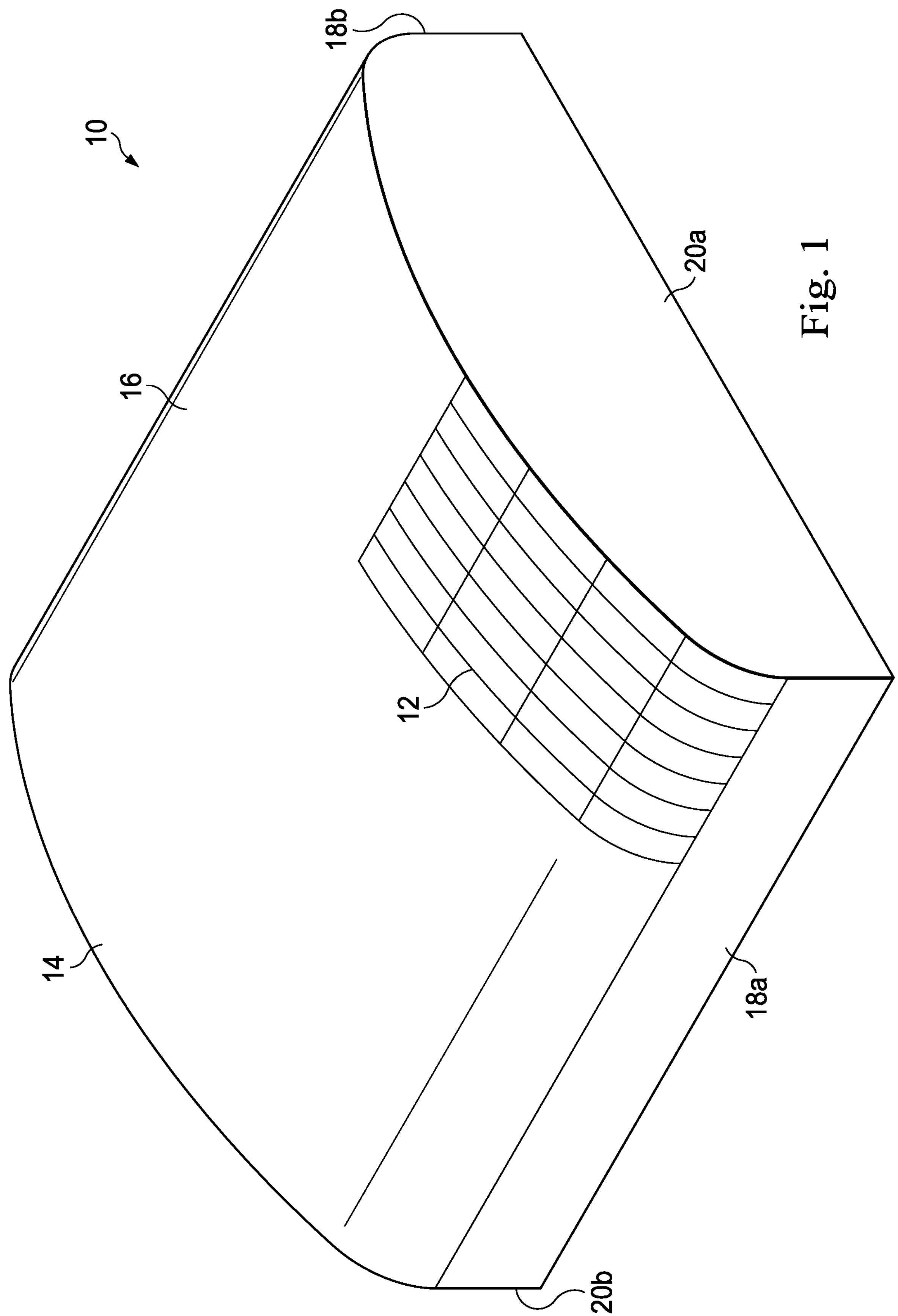
FIG. 1 is a perspective view of an illustrative embodiment of a blast resistant shelter, the blast resistant shelter including a frame and a canopy, the frame and the canopy together defining a roof, walls, and gable ends, according to one or more embodiments of the present disclosure.
Figure 2:
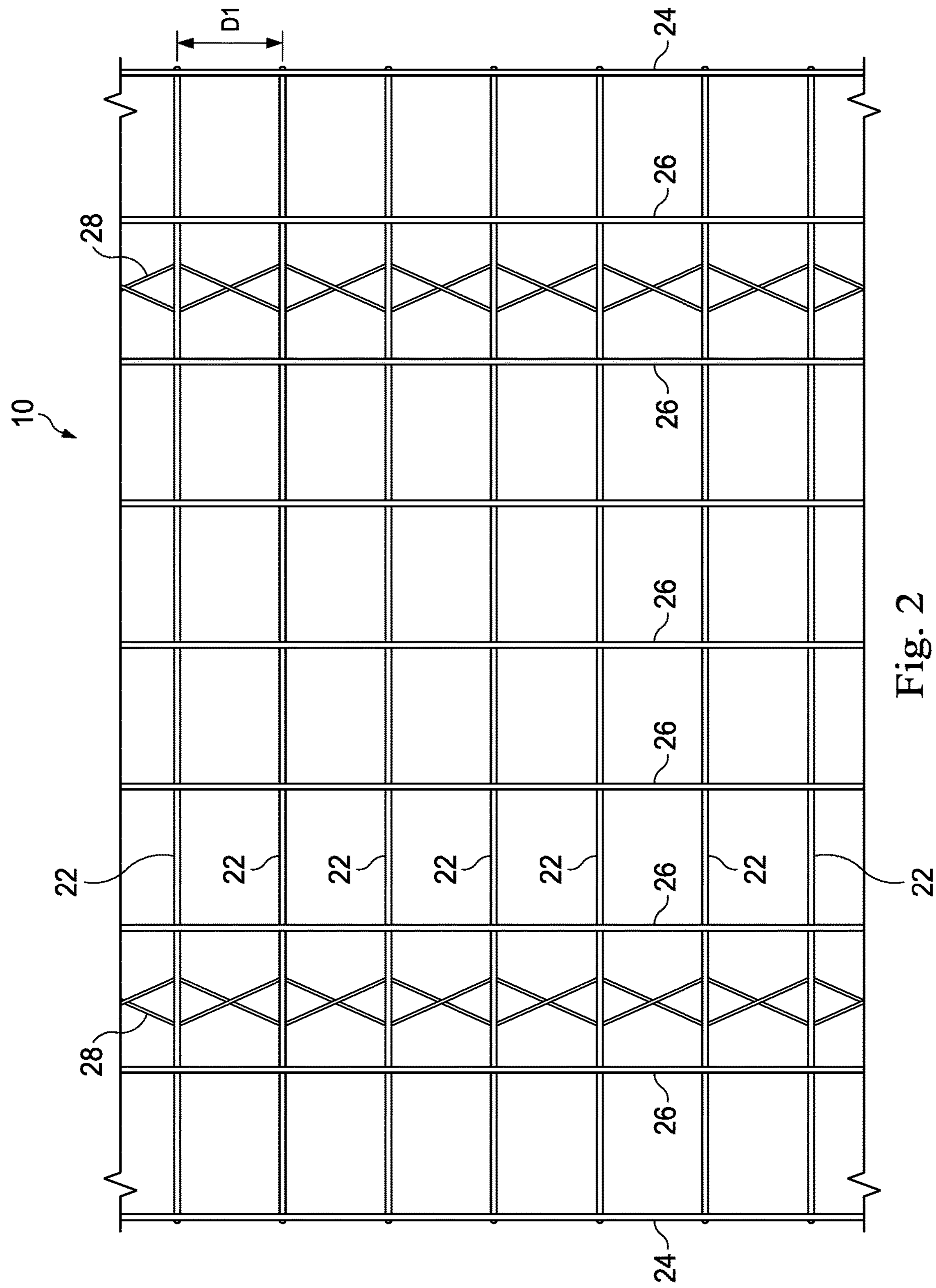
FIG. 2 is a top plan view of the blast resistant shelter of FIG. 1 with the canopy omitted from view, the frame of the blast resistant shelter including a plurality of trusses, according to one or more embodiments of the present disclosure.

Referring initially to FIGS. 1 and 2, a blast resistant shelter is generally referred to by the reference numeral 10. FIG. 1 is a perspective view of the blast resistant shelter 10, which includes a frame 12 and a canopy 14. The frame 12 and the canopy 14 together define a roof 16, walls 18*a* and 18*b*, and gable ends 20*a* and 20*b*. The frame 12 includes a plurality of structural members such as, for example, trusses 22. The trusses 22 are spaced apart by a dimension D1, as shown in FIG. 2's top plan view of the blast resistant shelter 10 (with the canopy 14 omitted from view). In some embodiments, the trusses 22 are spaced apart in a substantially parallel relation. In some embodiments, the dimension D1 is approximately 4' (feet). The trusses 22 are interconnected by a plurality of purlins including, for example, eave purlins 24 and roof purlins 26. The eave purlins 24 and the roof purlins 26 are spaced in a substantially perpendicular relation with the trusses 22 and, in combination, maintain the substantially parallel spacing of the trusses 22. In some embodiments, the eave purlins 24 are spaced apart from the outermost roof purlins 26 by intervals of approximately 6'. In some embodiments, the roof purlins 26 are spaced apart from one another at intervals of approximately 8'. The trusses 22 are also interconnected by roof bracing 28. Similarly to the eave purlins 24 and the roof purlins 26, the roof bracing 28 maintains the substantially parallel spacing of the trusses 22; additionally, the roof bracing 28 prevents, or at least reduces, torsional strain on the trusses 22 when the blast resistant shelter 10 is in use.

Figure 3:
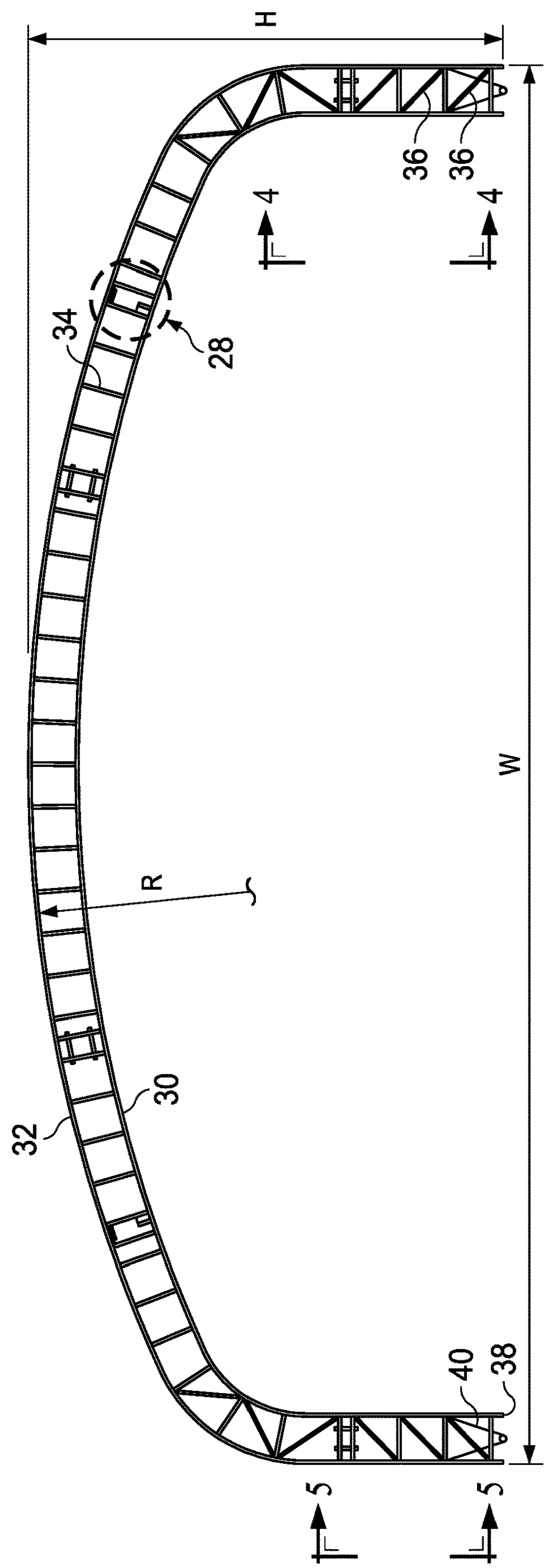
FIG. 3 is a front elevational view of the blast resistant shelter of FIG. 2, according to one or more embodiments of the present disclosure.

Referring to FIG. 3 with continuing reference to FIGS. 1 and 2, each truss 22 includes an internal chord 30 and an external chord 32 defining a width W, a height H, and a radius R of the blast resistant shelter 10. In some embodiments, the width W is approximately 60'. In some embodiments, the height H is approximately 20'. In some embodiments, the radius R is approximately 64'. The internal chord 30 is spaced apart from, and coupled to, the external chord 32 by a plurality of spacers 34 and a plurality of diagonal braces 36. In some embodiments, the internal chord 30, the external chord 32, the spacers 34, and/or the diagonal braces 36 are constructed from 15 gauge round tubing with an outside diameter of 1.9" (inches) and a minimum yield strength (Fy) of 50 KSI. In some embodiments the spacers 34 are spaced apart from one another by a maximum of approximately 2'. In some embodiments, the internal chord 30 and the external chord 32 are spaced apart in a substantially parallel relation. In some embodiments, the internal chord 30 and the external chord 32 are spaced apart by approximately 2'. In addition to being interconnected by the eave purlins 24, the roof purlins 26, and the roof bracing 28, the trusses 22 are also interconnected at opposing end portions thereof by structural members such as, for example, base beams 38. Finally, in some embodiments, the opposing end portions of the trusses 22 are coupled, via anchor cables 40, to anchors set in the ground. In some embodiments, the anchor cables 40 are connected to band clamps (not shown) on the internal and external chords 30 and 32 above the second horizontal spacer 34. In some embodiments, the anchor cables 40 are 5⁄16" 6×19 aircraft cables. In some embodiments, the anchors set in the ground are sized to resist reaction forces (e.g., uplift) on the blast resistant shelter 10.

Figure 4:
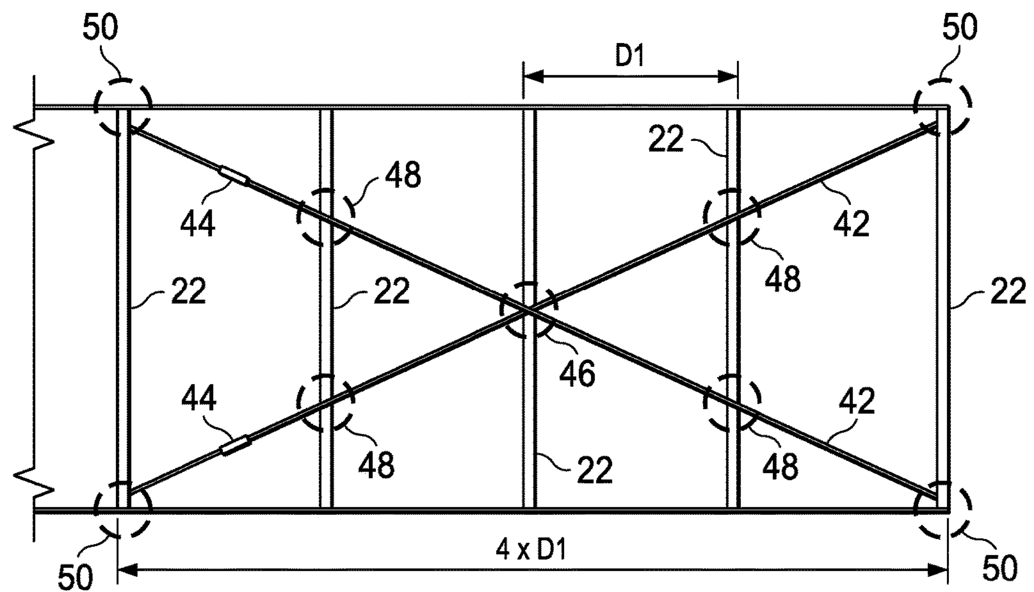
FIG. 4 is an interior elevational view of the blast resistant shelter of FIGS. 1-3, taken along the line 4-4 of FIG. 3, according to one or more embodiments of the present disclosure.

Referring to FIG. 4 with continuing reference to FIGS. 1-3, diagonal bracing cables 42 are coupled to the internal chords 30 of the trusses 22 to provide structural integrity to the blast resistant shelter 10 (the anchor cables 40 are omitted from view in FIG. 4 to more clearly illustrate the bracing cables 42). More particularly, in some embodiments, each set of five (5) trusses 22 of the blast resistant shelter 10 includes a pair of the diagonal bracing cables 42. In some embodiments, the bracing cables 42 each include a turnbuckle 44 for tensioning. In some embodiments, the bracing cables 42 cross one another at a location indicated by reference numeral 46. Moreover, in some embodiments, the bracing cables 42 are coupled to the trusses 22 at locations indicated by the reference numeral 46 and reference numerals 48 and 50.

Figure 5:
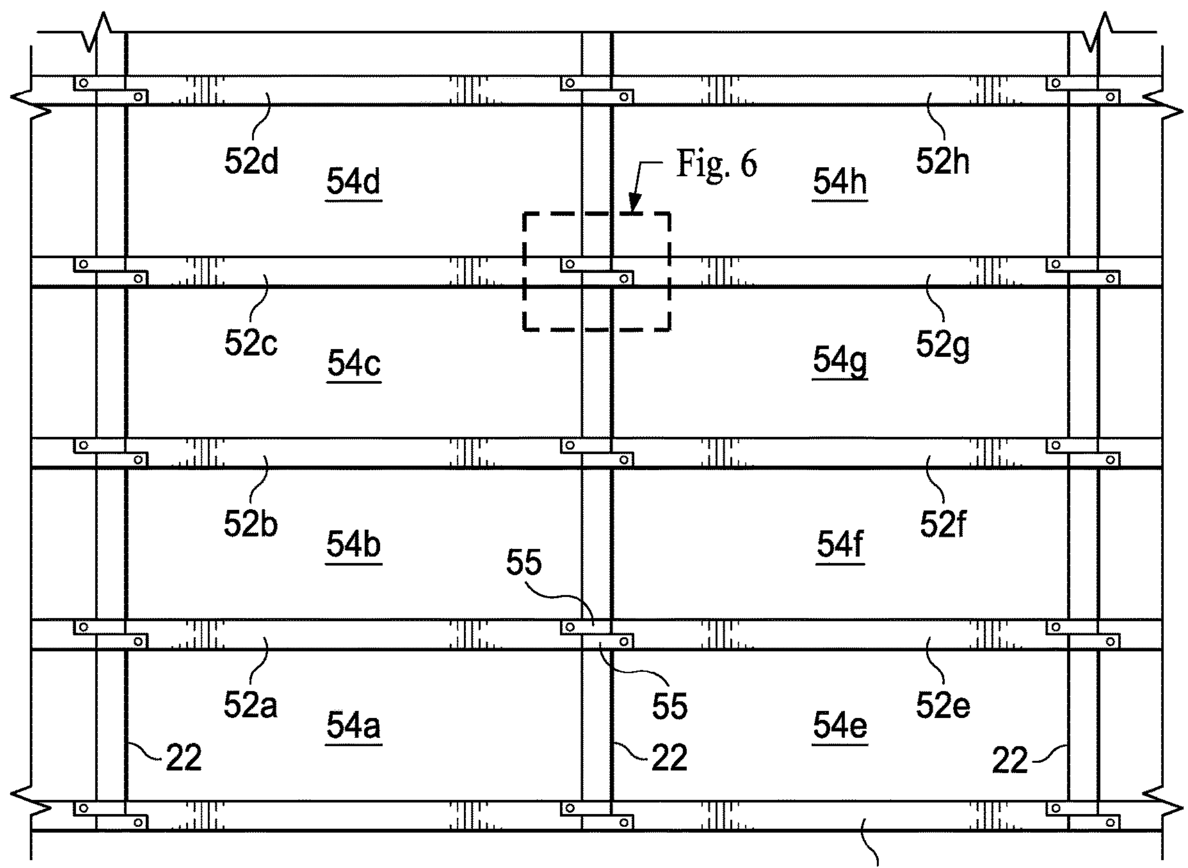
FIG. 5 is an exterior elevational view of the blast resistant shelter of FIGS. 1-3, taken along the line 5-5 of FIG. 3, the wall including a plurality of wall girts coupled to the trusses, according to one or more embodiments of the present disclosure.
Figure 6:
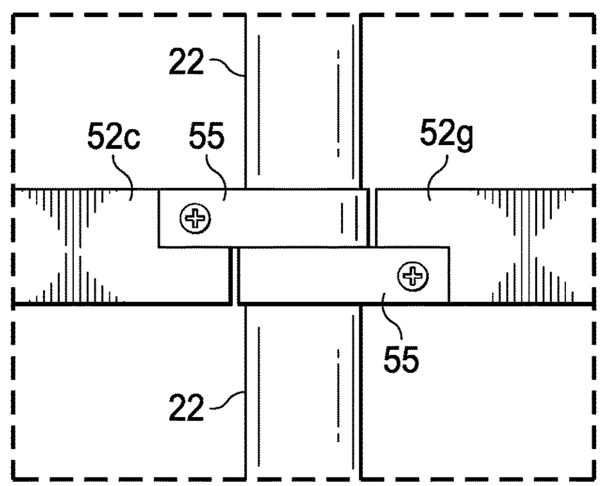
FIG. 6 is an enlarged view of the blast resistant shelter of FIG. 5 showing band clamps by which the wall girts are coupled to the trusses, according to one or more embodiments of the present disclosure.

Referring to FIGS. 5 and 6 with continuing reference to FIGS. 1-4, the walls 18*a* and 18*b* of the blast resistant shelter 10 each include a plurality of structural members such as, for example, wall girts 52*a-h*. The wall girts 52*a-h* are coupled to the external chords 32 of the trusses 22 (the anchor cables 40 and the bracing cables 42 are omitted from view in FIGS. 5 and 6 to more clearly illustrate the wall girts 52*a-h*). A plurality of airways 54*a-h* are defined adjacent the wall girts 52*a-h*, respectively, and between the trusses 22. In some embodiments, the wall girts 52*a-h* extend in a substantially perpendicular relation with the trusses 22, and are coupled to the external chords 32 of the trusses using band clamps 55. FIG. 6 is an enlarged view of FIG. 5 clearly showing the band clamps 55 coupling the wall girts 52*c* and 52*g* to one of the trusses 22. In some embodiments, the band clamps 55 are secured to the wall girts 52*a-h* using 3⁄8" diameter bolts. In some embodiments, one or more of the band clamps 55 are further secured to the trusses 22 via a fastener (not shown; for example, a ¼" self-tapping screw) extending through the band clamp 55 and into the external chord 32. In some embodiments, the wall girts 52*a-d* are evenly spaced from the base beam 38, and the wall girts 52*e-h* are evenly spaced from the base beam 38.

In some embodiments, the wall girts 52*a-h* are constructed from 15 gauge round tubing with an outside diameter of 1.9" and a minimum yield strength (Fy) of 50 KSI. In some embodiments, the wall girts 52*a-h* are constructed from 18 gauge round tubing with an outside diameter of 1.315" and a minimum yield strength (Fy) of 50 KSI. However, although described herein as being constructed from round tubing, the wall girts 52*a-h* may instead be constructed using various sizes and shapes of bar stock (e.g., flat bar stock or round bar stock) or any other suitable material. In some embodiments, the wall girts 52*a* and 52*e*, the wall girts 52*b* and 52*f*, the wall girts 52*c* and 52*g*, and/or the wall girts 52*d* and 52*h* are substantially co-axial. In some embodiments, the wall girts 52*a* and 52*e*, the wall girts 52*b* and 52*f*, the wall girts 52*c* and 52*g*, and/or the wall girts 52*d* and 52*h* are integrally formed as continuous components.

Figure 7:
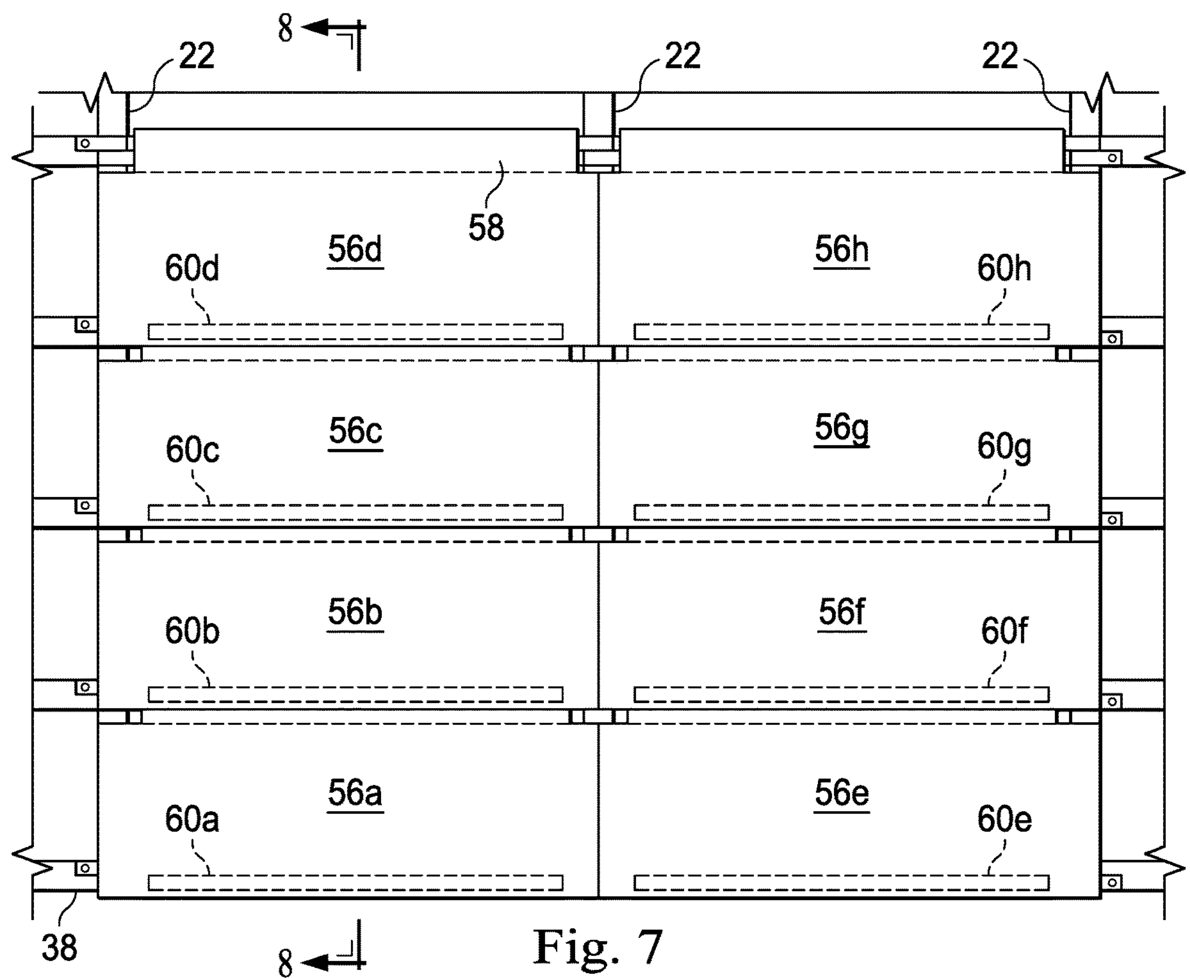
FIG. 7 is an elevational view of the blast resistant shelter of FIG. 5, the blast resistant shelter including a plurality of blast panels pivotably mounted to the wall girts, according to an embodiment, according to one or more embodiments of the present disclosure.
Figure 8:
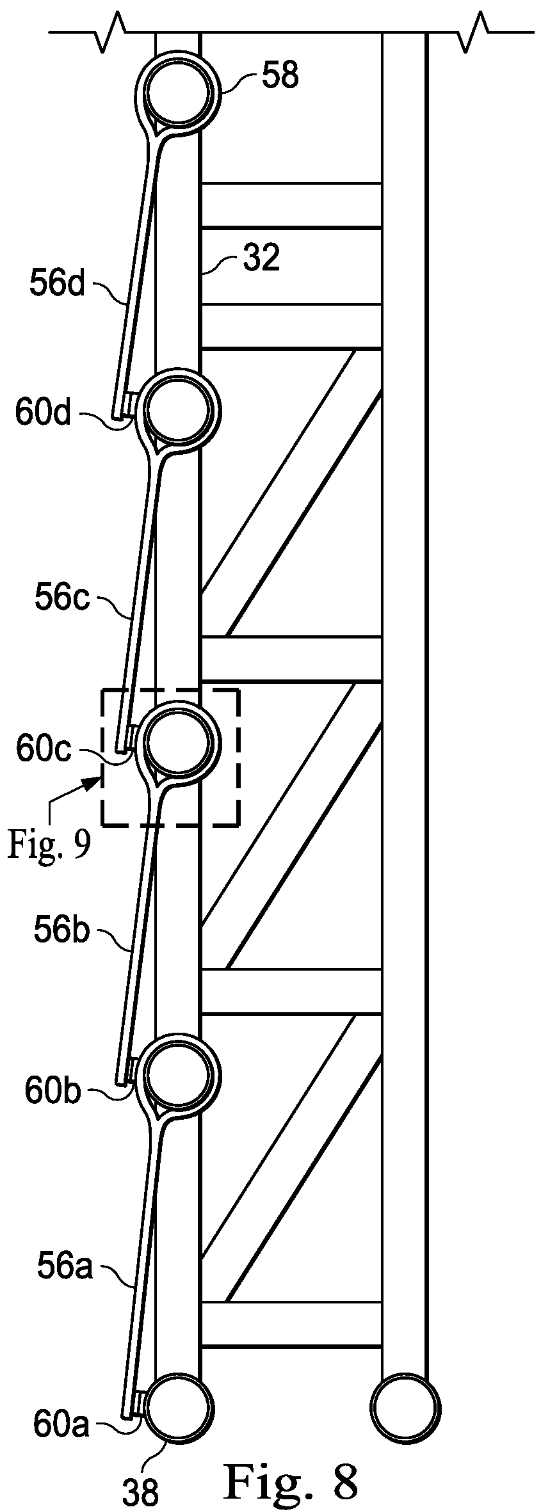
FIG. 8 is a sectional view of the blast resistant shelter of FIG. 7, taken along the line 8-8 of FIG. 7, according to one or more embodiments of the present disclosure.
Figure 9:
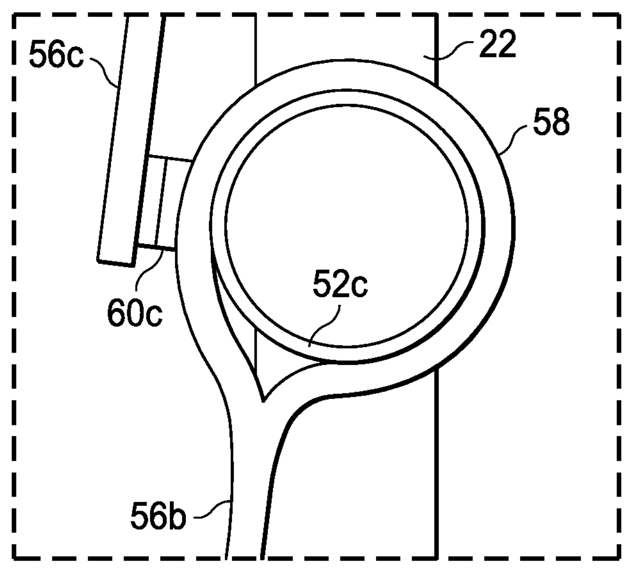
FIG. 9 is an enlarged view of the blast resistant shelter of FIG. 8, according to one or more embodiments of the present disclosure.

Referring to FIGS. 7-9 with continuing reference to FIGS. 1-6, the blast resistant shelter 10 includes a plurality of blast panels 56*a-h*. The plurality of blast panels 56*a-h* define part of the canopy 14. The blast panels 56*a-h* are pivotably mounted to the wall girts 52*a-h*, respectively, and adapted to pivot thereabout in response to a blast wave. In some embodiments, the blast panels 56*a-h* each include a sleeve 58. The blast panels 56*a-h* are retained on the wall girts 52*a-h* by sheathing the respective sleeves 58 of the blast panels 56*a-h* onto the wall girts 52*a-h* and coupling the wall girts 52*a-h* to the trusses 22 via the band clamps 55. However, rather than being sheathed onto the wall girts 52*a-h* via the respective sleeves 58, the blast panels 56*a-h* may be pivotably mounted to the wall girts 52*a-h* in any suitable manner. Alternatively, the blast panels 56*a-h* (or other blast panels) may be pivotably mounted in a similar manner to the respective trusses 22 and adapted to pivot thereabout in response to the blast wave.

As shown in FIGS. 7 and 8, the blast panel 56*a* is detachably connected to the base beam 38, opposite the wall girt 52*a*, via a fastener 60*a*; the blast panel 56*b* is detachably connected to the blast panel 56*a*, opposite the wall girt 52*b*, via a fastener 60*b*; the blast panel 56*c* is detachably connected to the blast panel 56*b*, opposite the wall girt 52*c*, via a fastener 60*c* (shown in FIGS. 7-9); and/or the blast panel 56*d* is detachably connected to the blast panel 56*c*, opposite the wall girt 52*d*, via a fastener 60*d*. Similarly, as shown in FIG. 7, the blast panel 56*e* is detachably connected to the base beam 38, opposite the wall girt 52*e*, via a fastener 60*e*; the blast panel 56*f* is detachably connected to the blast panel 56*e*, opposite the wall girt 52*f*, via a fastener 60*f*; the blast panel 56*g* is detachably connected to the blast panel 56*f*, opposite the wall girt 52*g*, via a fastener 60*g*; and/or the blast panel 56*h* is detachably connected to the blast panel 56*g*, opposite the wall girt 52*h*, via a fastener 60*h*.

In some embodiments, the fasteners 60*a-h* are hook-and-loop fasteners. However, one or more of the fasteners 60*a-h* may be another type of fastener such as, for example, snaps, buttons, magnets, buckles, tape, adhesive, other types of fasteners, or any combination thereof. In some embodiments, the fasteners 60*a-h* include a heat activated adhesive so as to be iron-able onto the blast panels 56*a-h*.

FIG. 8 is a sectional view illustrating the blast panel 56*a* detachably connected to (via the fastener 60*a*), and overlapping, the base beam 38; the blast panel 56*b* detachably connected to (via the fastener 60*b*), and overlapping, the blast panel 56*a*; the blast panel 56*c* detachably connected to (via the fastener 60*c*), and overlapping, the blast panel 56*b*; and the blast panel 56*d* detachably connected to (via the fastener 60*d*), and overlapping, the blast panel 56*b*. FIG. 9 is an enlarged view of the blast panels 56*b* and 56*c* of FIG. 8 clearly showing the blast panel 56*c* detachably connected (via the fastener 60*c*), and overlapping, the blast panel 56*b*.

As discussed above, in some embodiments, the blast panels 56*a-d* are not sheathed onto the wall girts 52*a-d*, respectively, but are instead pivotably mounted to the wall girts 52*a-d* in another suitable manner; in such embodiments (or other embodiments), in addition to, or instead of, being detachably connected to the blast panels 56*a-c*, respectively, the blast panels 56*b-d* may be detachably connected to the wall girts 52*a-c* via the fasteners 60*b-d*, respectively. Similarly, as discussed above, in some embodiments, the blast panels 56*e-h* are not sheathed onto the wall girts 52*e-h*, respectively, but are instead pivotably mounted to the wall girts 52*e-h* in another suitable manner; in such embodiments (or other embodiments), in addition to, or instead of, being detachably connected to the blast panels 56*e-g*, respectively, the blast panels 56*f-h* may be detachably connected to the wall girts 52*e-g* via the fasteners 60*f-h*, respectively.

Moreover, in those embodiments in which the blast panels 56*a-h* (or other blast panels) are pivotably mounted to the respective trusses 22, rather than being pivotably mounted to the wall girts 52*a-h*, the blast panels 56*a-h* (or the other blast panels) may be detachably coupled via fasteners (not shown) to adjacent ones of the trusses 22. In addition to, or instead of, being detachably connected to the trusses 22, the blast panels 56*a-h* (or the other blast panels) may be detachably connected via fasteners (not shown) to the base beam 38, the wall girts 52*a-h*, an adjacent one of the trusses 22, and/or an adjacent one of the blast panels.

Figure 10:
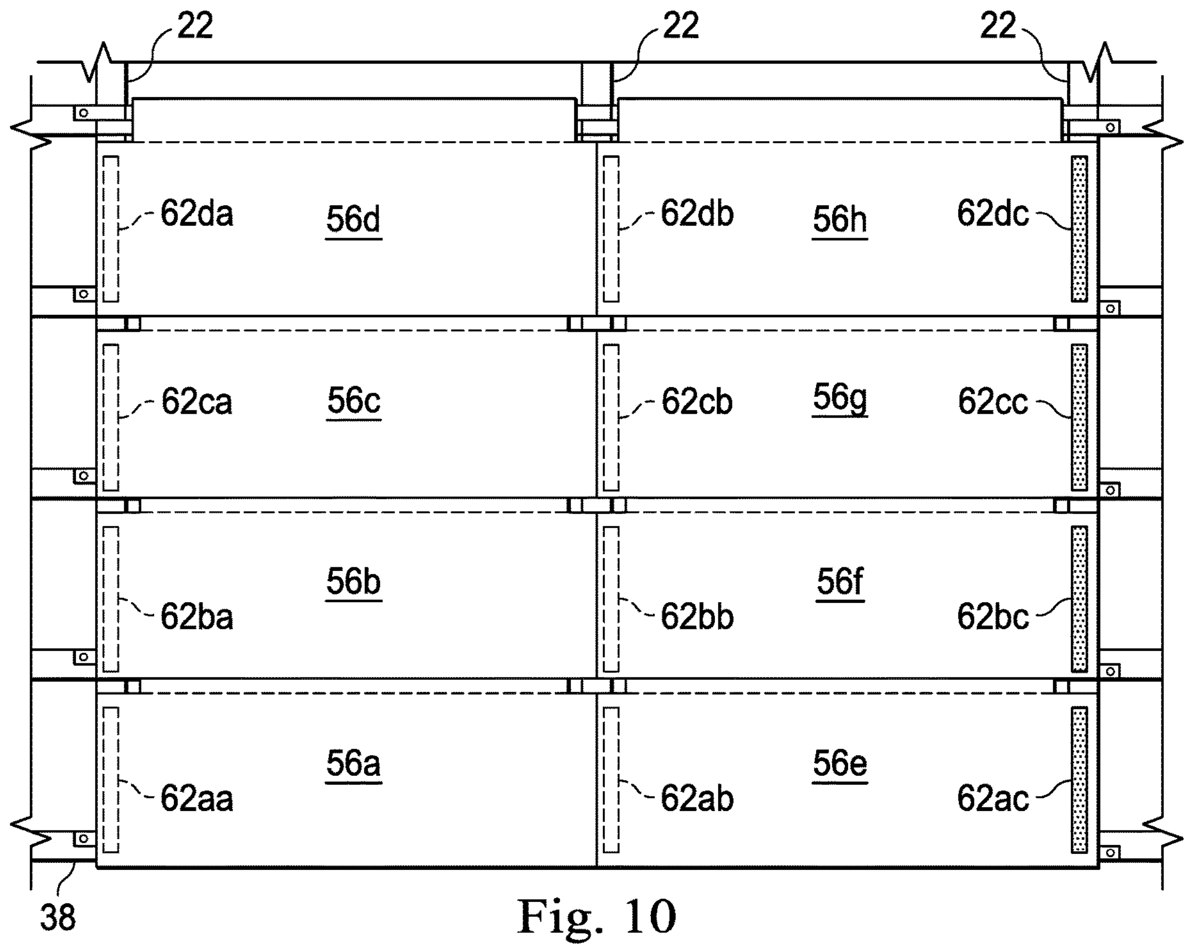
FIG. 10 is an elevational view of the blast resistant shelter of FIG. 5, the blast resistant shelter including a plurality of blast panels pivotably mounted to the wall girts, according to an embodiment, according to one or more embodiments of the present disclosure.

Referring to FIG. 10 with continuing reference to FIGS. 7-9, the blast panels 56*e-h* at least partially overlap the blast panels 56*a-d*, respectively. Thus, in addition to, or instead of, being detachably connected to the base beam 38 via the fasteners 60*a* and 60*e*, respectively, the blast panels 56*a* and 56*e* may be detachably connected to one another via fastener(s) 62*ab*. The blast panels 56*a* and 56*e* may also include fasteners 62*aa* and 62*ac*, respectively, for detachable connection to adjacent blast panels (not shown). Further, in addition to, or instead of, being detachably connected to the blast panels 56*a* and 56*e* (and/or the wall girts 52*a* and 52*e*), via the fasteners 60*b* and 60*f*, respectively, the blast panels 56*b* and 56*f* may be detachably connected to one another via fastener(s) 62*bb*. The blast panels 56*b* and 56*f* may also include fasteners 62*ba* and 62*bc*, respectively, for detachable connection to adjacent blast panels (not shown). Further still, in addition to, or instead of, being detachably connected to the blast panels 56*b* and 56*f* (and/or the wall girts 52*b* and 52*f*), via the fasteners 60*c* and 60*g*, respectively, the blast panels 56*c* and 56*g* may be detachably connected to one another via fastener(s) 62*cb*. The blast panels 56*c* and 56*g* may also include fasteners 62*ca* and 62*cc*, respectively, for detachable connection to adjacent blast panels (not shown). Finally, in addition to, or instead of, being detachably connected to the blast panels 56*c* and 56*g* (and/or the wall girts 52*c* and 52*g*), via the fasteners 60*d* and 60*h*, respectively, the blast panels 56*d* and 56*h* may be detachably connected to one another via fastener(s) 62*db*. The blast panels 56*d* and 56*h* may also include fasteners 62*da* and 62*dc*, respectively, for detachable connection to adjacent blast panels (not shown).

In some embodiments, the fasteners 62*aa*, 62*ab*, 62*ac*, 62*ba*, 62*bb*, 62*bc*, 62*ca*, 62*cb*, 62*cc*, 62*da*, 62*db*, and 62*dc* are hook-and-loop fasteners. However, one or more of the fasteners 62*aa*, 62*ab*, 62*ac*, 62*ba*, 62*bb*, 62*bc*, 62*ca*, 62*cb*, 62*cc*, 62*da*, 62*d* b, and 62*d* c may be another type of fastener such as, for example, snaps, buttons, magnets, buckles, tape, adhesive, other types of fasteners, or any combination thereof. In some embodiments, the fasteners 62*aa*, 62*ab*, 62*ac*, 62*ba*, 62*bb*, 62*bc*, 62*ca*, 62*cb*, 62*cc*, 62*da*, 62*db*, and 62*dc* include a heat activated adhesive so as to be iron-able onto the blast panels 56*a-h*.

In some embodiments, in addition to, or instead of, the blast panels 56*a* and 56*e* being detachably connected to one another via the fastener(s) 62*ab*, the blast panels 56*a* and 56*e* may be detachably connected to the adjacent truss 22 via the fastener(s) 62*ab*. Moreover, in addition to, or instead of, the blast panels 56*a* and 56*e* being detachably connected to the adjacent blast panels (not shown) via the fasteners 62*aa* and 62*ac*, respectively, the blast panels 56*a* and 56*e* may be detachably connected to the adjacent trusses 22 via the respective fasteners 62*aa* and 62*ac*.

In some embodiments, in addition to, or instead of, the blast panels 56*b* and 56*f* being detachably connected to one another via the fastener(s) 62*bb*, the blast panels 56*b* and 56*f* may be detachably connected to the adjacent truss 22 via the fastener(s) 62*bb*. Moreover, in addition to, or instead of, the blast panels 56*b* and 56*f* being detachably connected to the adjacent blast panels (not shown) via the fasteners 62*ba* and 62*bc*, respectively, the blast panels 56*b* and 56*f* may be detachably connected to the adjacent trusses 22 via the respective fasteners 62*ba* and 62*bc*.

In some embodiments, in addition to, or instead of, the blast panels 56*c* and 56*g* being detachably connected to one another via the fastener(s) 62*cb*, the blast panels 56*c* and 56*g* may be detachably connected to the adjacent truss 22 via the fastener(s) 62*cb*. Moreover, in addition to, or instead of, the blast panels 56*c* and 56*g* being detachably connected to the adjacent blast panels (not shown) via the fasteners 62*ca* and 62*cc*, respectively, the blast panels 56*c* and 56*g* may be detachably connected to the adjacent trusses 22 via the respective fasteners 62*ca* and 62*cc*.

In some embodiments, in addition to, or instead of, the blast panels 56*d* and 56*h* being detachably connected to one another via the fastener(s) 62*db*, the blast panels 56*d* and 56*h* may be detachably connected to the adjacent truss 22 via the fastener(s) 62*db*. Moreover, in addition to, or instead of, the blast panels 56*d* and 56*h* being detachably connected to the adjacent blast panels (not shown) via the fasteners 62*da* and 62*dc*, respectively, the blast panels 56*d* and 56*h* may be detachably connected to the adjacent trusses 22 via the respective fasteners 62*da* and 62*dc*.

Figure 11:
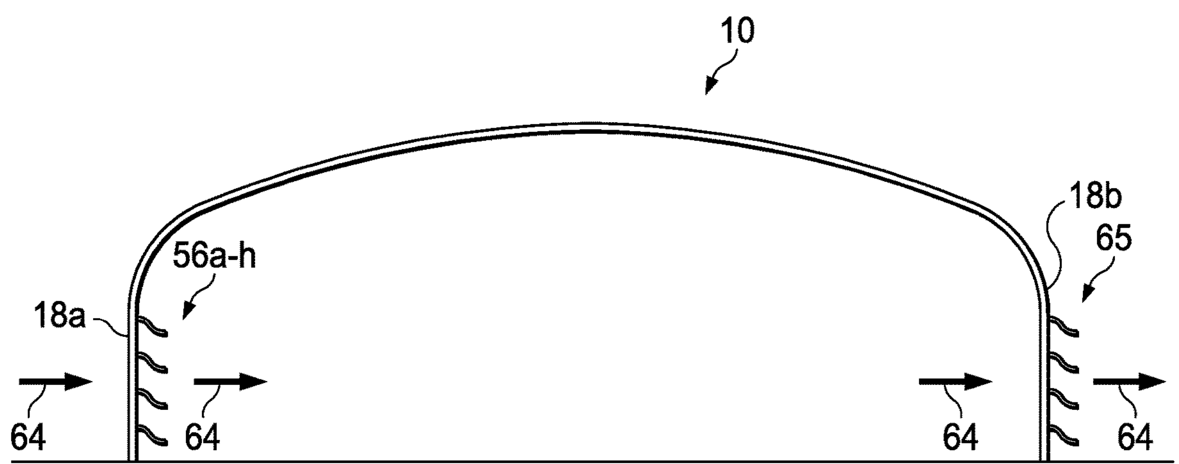
FIG. 11 is a diagrammatic view of the blast resistant shelter of FIGS. 1-3 encountering a blast wave, according to one or more embodiments of the present disclosure.
Figure 12B:
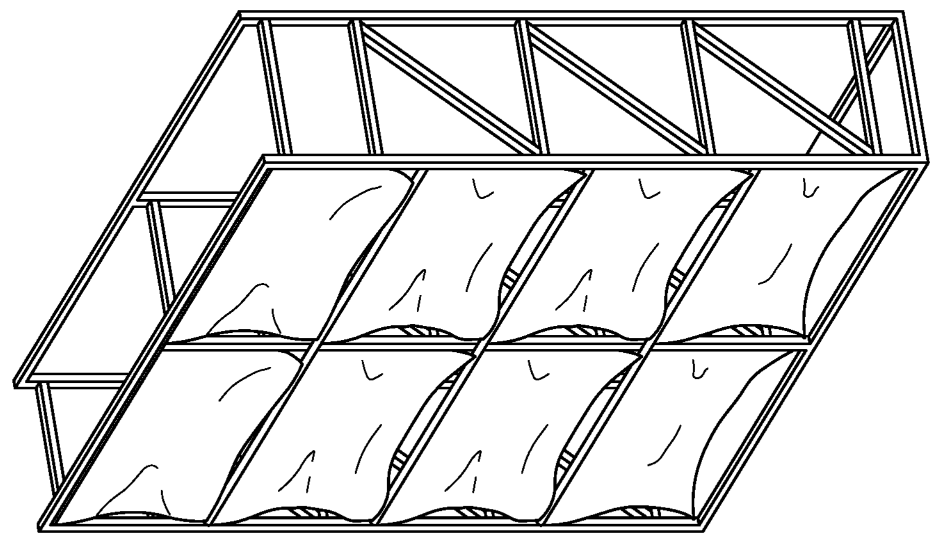
FIGS. 12(*a*)-(*f*) are time-lapse views of the blast panels of FIGS. 7-10 encountering the blast wave, according to one or more embodiments of the present disclosure.
Figure 12A:
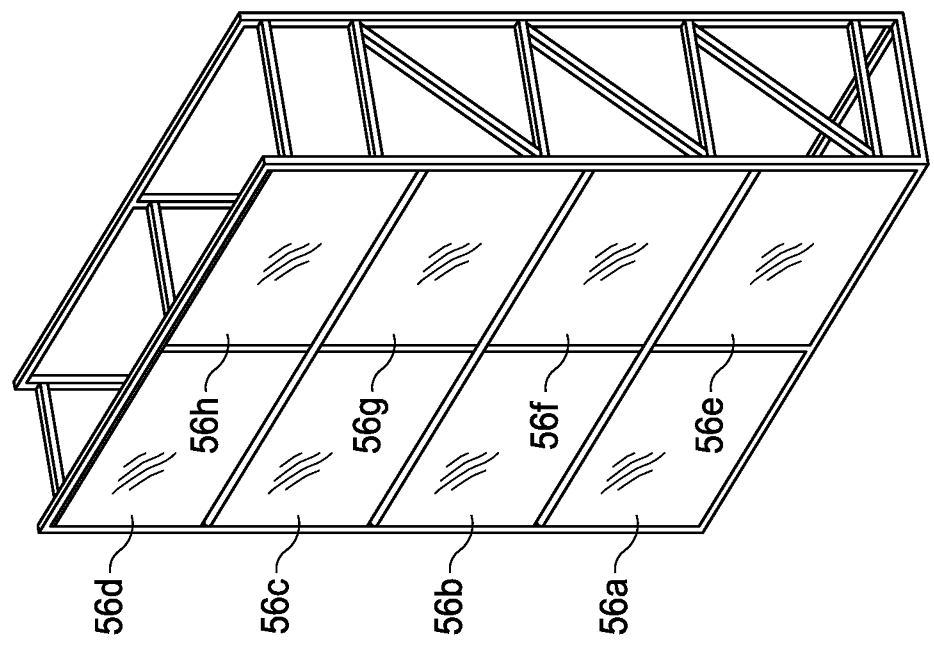
Figure 12D:
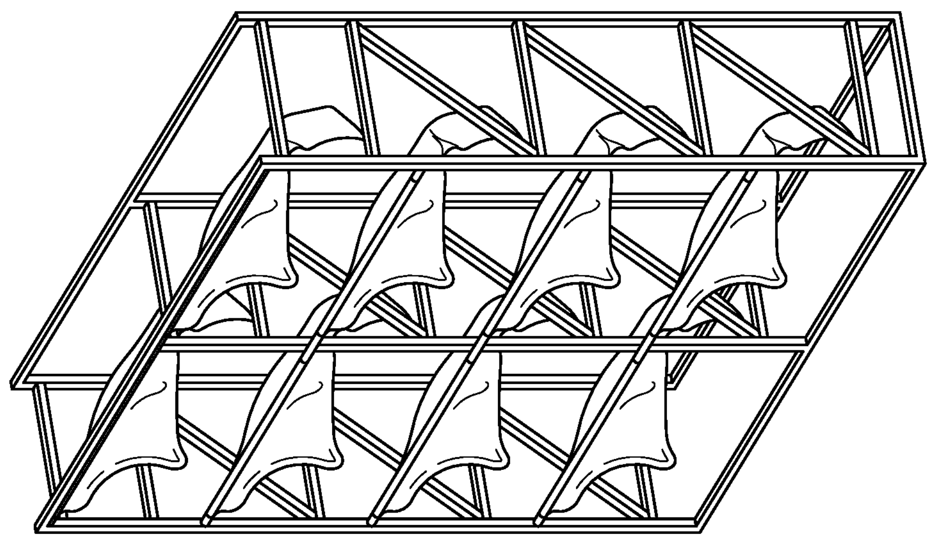
Figure 12C:
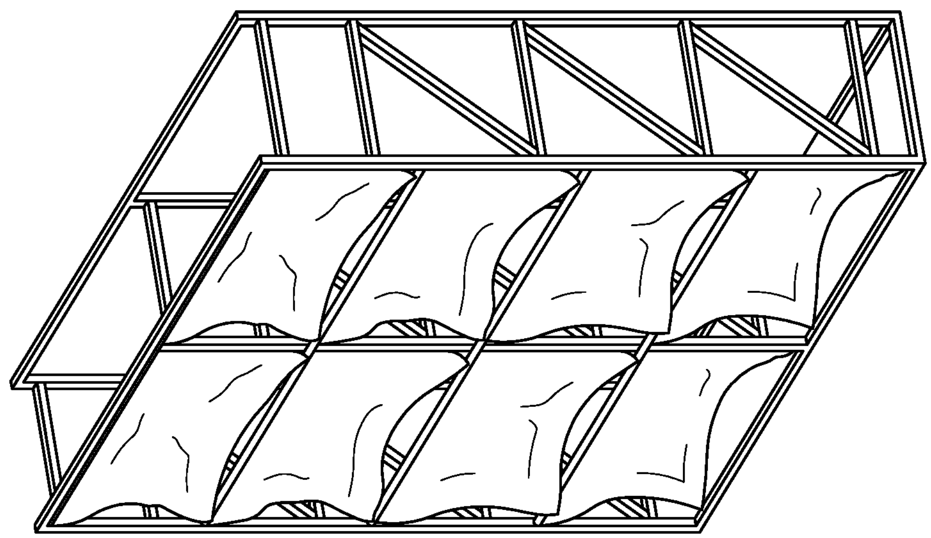
Figure 12F:
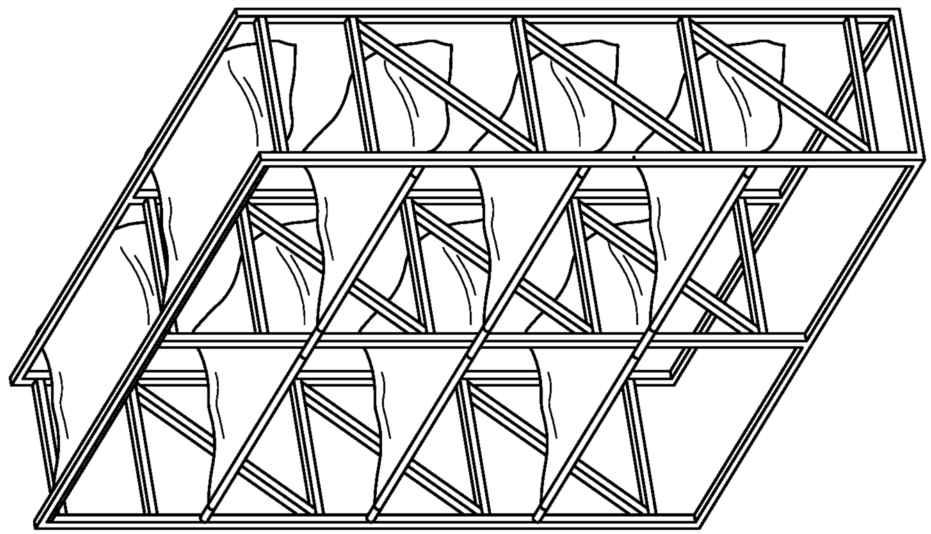
Figure 12E:
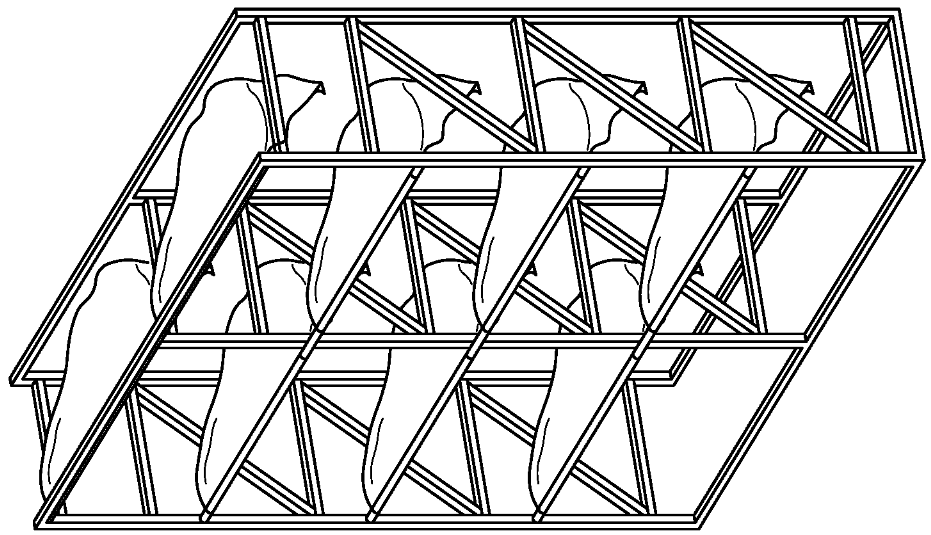

In operation, as illustrated in FIGS. 11 and 12(*a*)-(*f*) with continuing reference to FIGS. 1-10, the blast resistant shelter 10 is adapted to encounter a blast wave 64. FIG. 11 is an elevational view of the blast resistant shelter 10 showing that, when the blast resistant shelter 10 encounters the blast wave 64, the blast panels 56*a-h* of the wall 18*a* flap open to permit passage of the blast wave 64 through the wall 18*a* and into the interior of the blast resistant shelter 10. The blast wave 64 (which travels from left to right as viewed in FIG. 11) causes the blast panels 56*a-h* to flap open toward the interior of the blast resistant shelter 10. Additionally, blast panels 65 of the wall 18*b* flap open to permit passage of the blast wave 64 through the wall 18*b*. The blast wave 64 (which travels from left to right as viewed in FIG. 11) causes the blast panels 65 to flap open toward the exterior of the blast resistant shelter 10. The blast panels 65 are substantially identical to the blast panels 56*a-h*, and therefore will not be described in further detail. As a result of the flapping open of the blast panels 56*a-h*, passage of the blast wave 64 is permitted through the interior of the blast resistant shelter 10, thus reducing the overall load imparted on the frame 12 of the blast resistant shelter 10. As a result, the blast resistant shelter 10 is able to withstand the blast wave 64 without significant structural damage or collapse. FIGS. 12(*a*)-(*f*) are time-lapse views of the blast panels 56*a-h* encountering the blast wave 64. As shown in FIG. 12(*a*), in a first operational configuration, the blast panels 56*a-h* are detachably connected to respective portions (discussed above) of the blast resistant shelter 10 and prevented from pivoting about the wall girts 52*a-h*, respectively, so that the blast panels 56*a-h* prevent, or at least reduce, air flow through the airways 54*a-h*. As shown in FIGS. 12(*b*)-(*f*), in a second operational configuration, in response to the blast wave 64, the blast panels 56*a-h* are detached from the respective portions of the blast resistant shelter 10 and permitted to pivot about the wall girts 52*a-h*, respectively, so that air flow is permitted through the airways 54*a-h*.

More particularly, in response to the blast wave 64: the blast panels 56*a* and 56*e* detach from the base beam 38 via disconnection of the fasteners 60*a* and 60*e*; the blast panels 56*b* and 56*f* detach from the respective blast panels 56*a* and 56*e* (and/or the respective wall girts 52*a* and 52*e*) via disconnection of the fasteners 60*b* and 60*f*; the blast panels 56*c* and 56*g* detach from the respective blast panels 56*b* and 56*f* (and/or the respective wall girts 52*b* and 52*f*) via disconnection of the fasteners 60*c* and 60*g*; and the blast panels 56*d* and 56*h* detach from the respective blast panels 56*c* and 56*g* (and/or the respective wall girts 52*c* and 52*g*) via disconnection of the fasteners 60*d* and 60*h*. In addition, or instead, in those embodiments in which the fasteners 62*aa*, 62*ab*, 62*ac*, 62*ba*, 62*bb*, 62*bc*, 62*ca*, 62*cb*, 62*cc*, 62*da*, 62*db*, and 62*dc* are employed, the blast wave 64 detaches: the blast panels 56*a* and 56*e* from one another (and/or the adjacent truss 22) via disconnection of the fastener(s) 62*ab*; the blast panels 56*b* and 56*f* from one another (and/or the adjacent truss 22) via disconnection of the fastener(s) 62*b* b; the blast panels 56*c* and 56*g* from one another (and/or the adjacent truss 22) via disconnection of the fastener(s) 62*cb*; the blast panels 56*d* and 56*h* from one another (and/or the adjacent truss 22) via disconnection of the fastener(s) 62*db*; and the blast panels 56*a-h* from the adjacent blast panels (not shown; and/or the adjacent trusses 22) via disconnection of the fasteners 62*aa*, 62*ac*, 62*ba*, 62*bc*, 62*ca*, 62*cc*, 62*da*, and 62*dc*.

Figure 13:
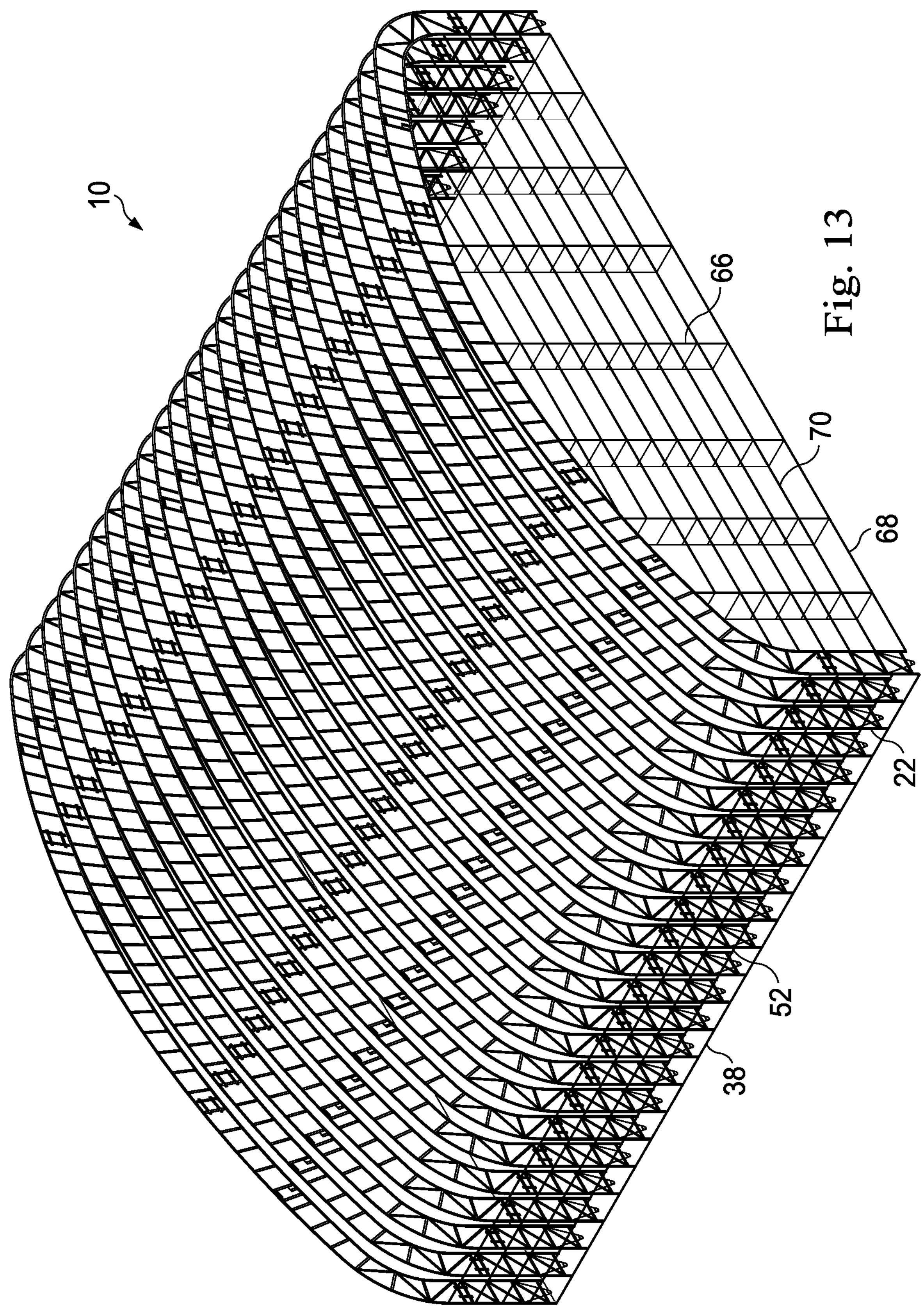
FIGS. 13 and 14 are perspective views of the blast resistant shelter of FIGS. 1-11 and 12(*a*)-(*f*) in an assembled state, the canopy being shown in FIG. 14 and omitted from view in FIG. 13, and the blast resistant shelter including blast panels at opposing walls and opposing gable ends thereof, according to one or more embodiments of the present disclosure.
Figure 14:
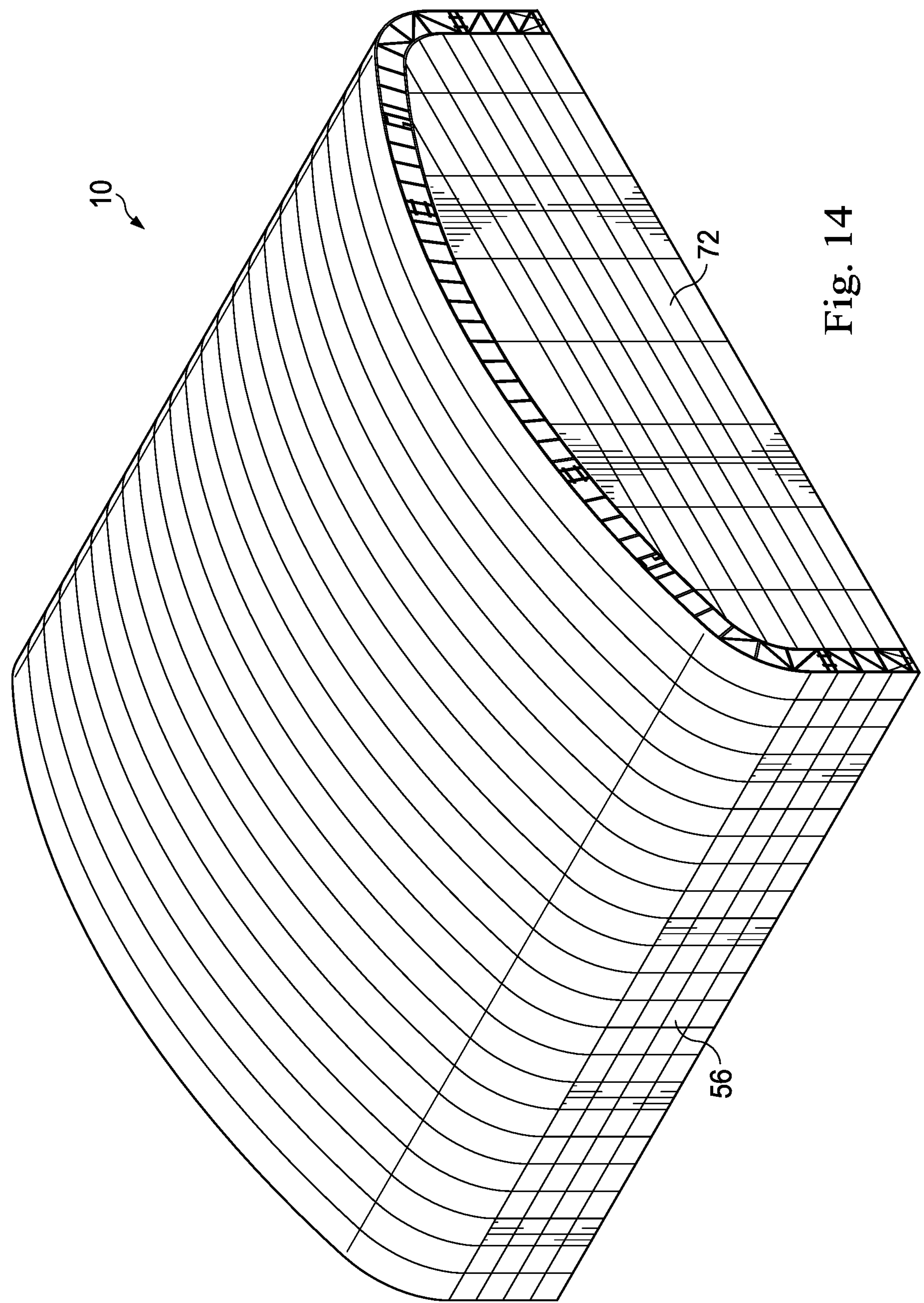
Figure 15A:
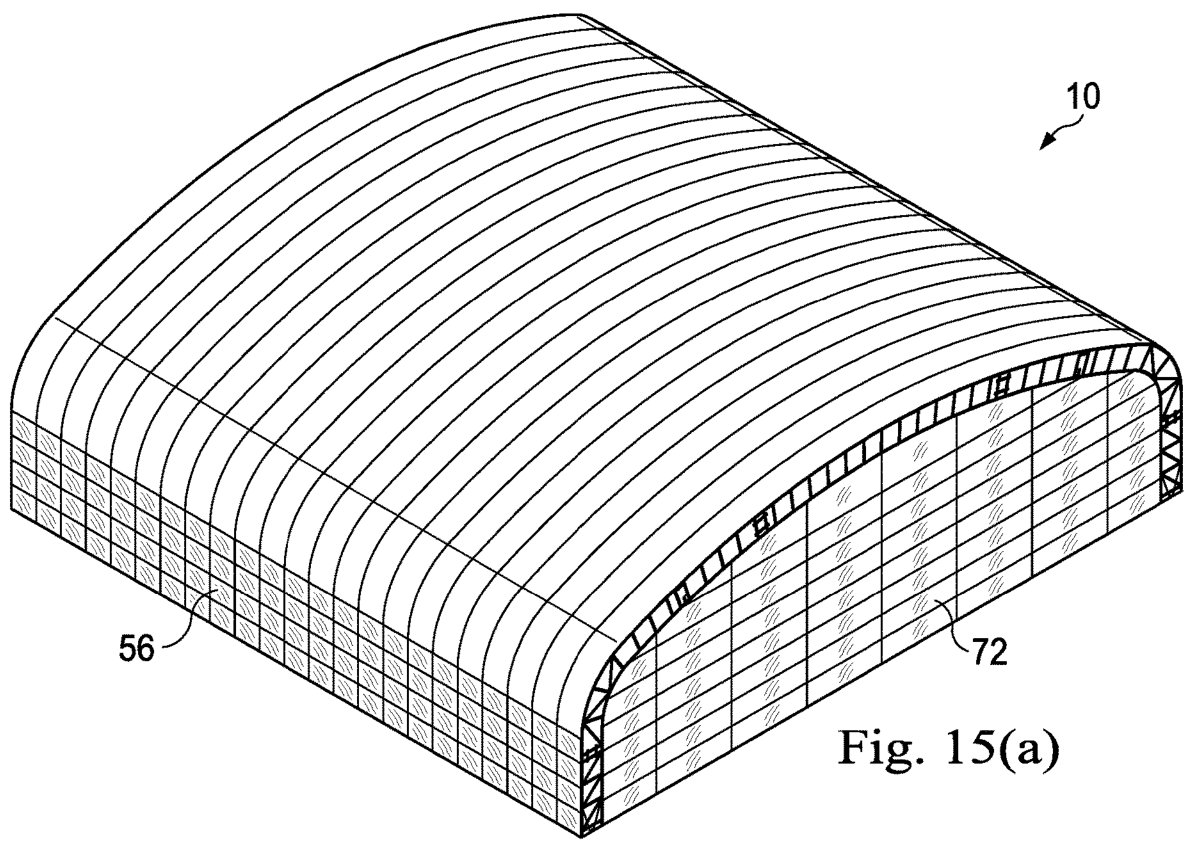
FIGS. 15(*a*)-(*d*) are time-lapse views of the blast panels of FIG. 14 encountering the blast wave, according to one or more embodiments of the present disclosure.
Figure 15B:
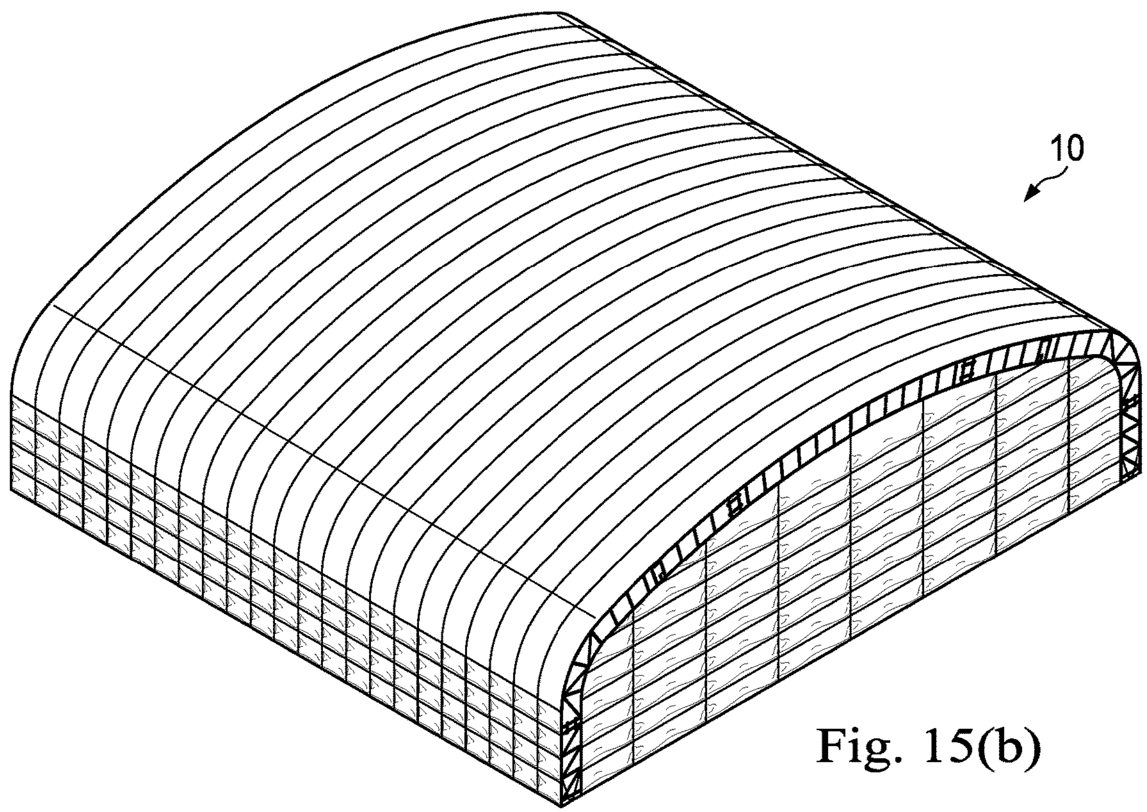
Figure 15C:
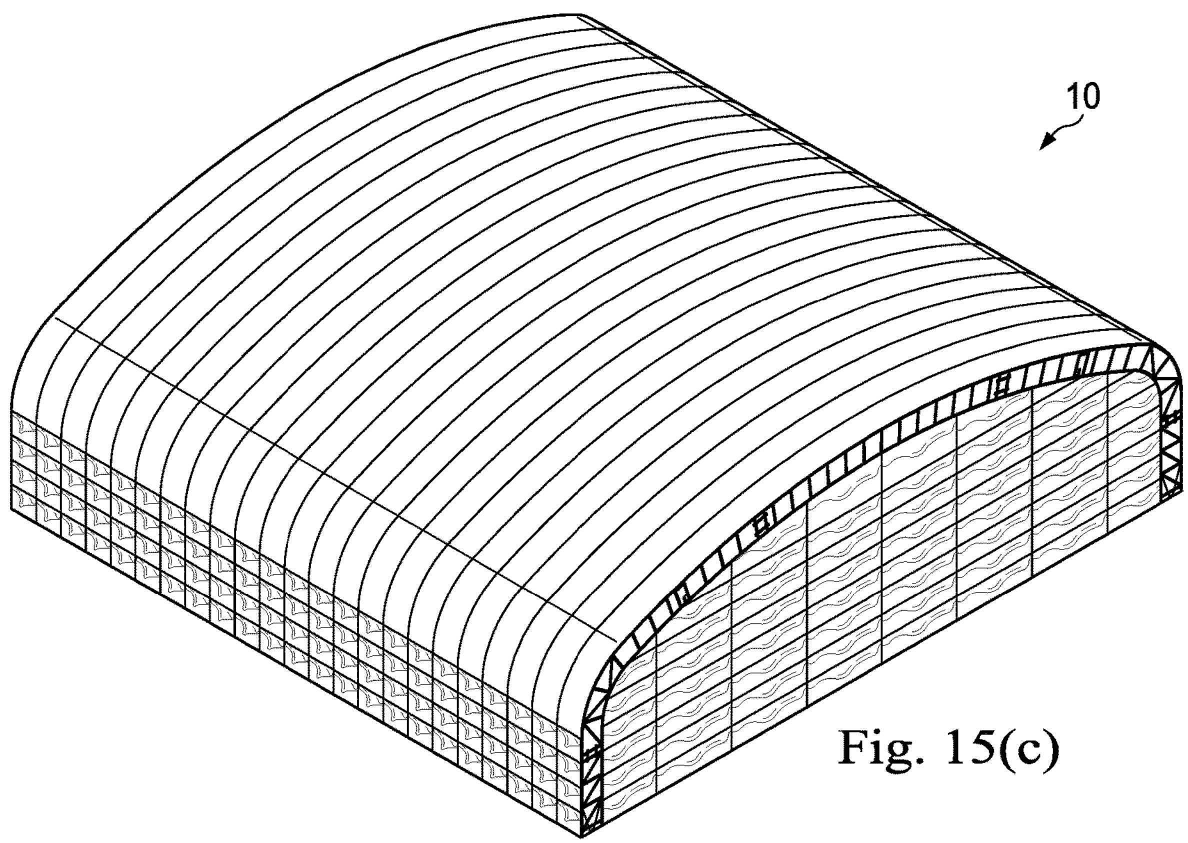
Figure 15D:
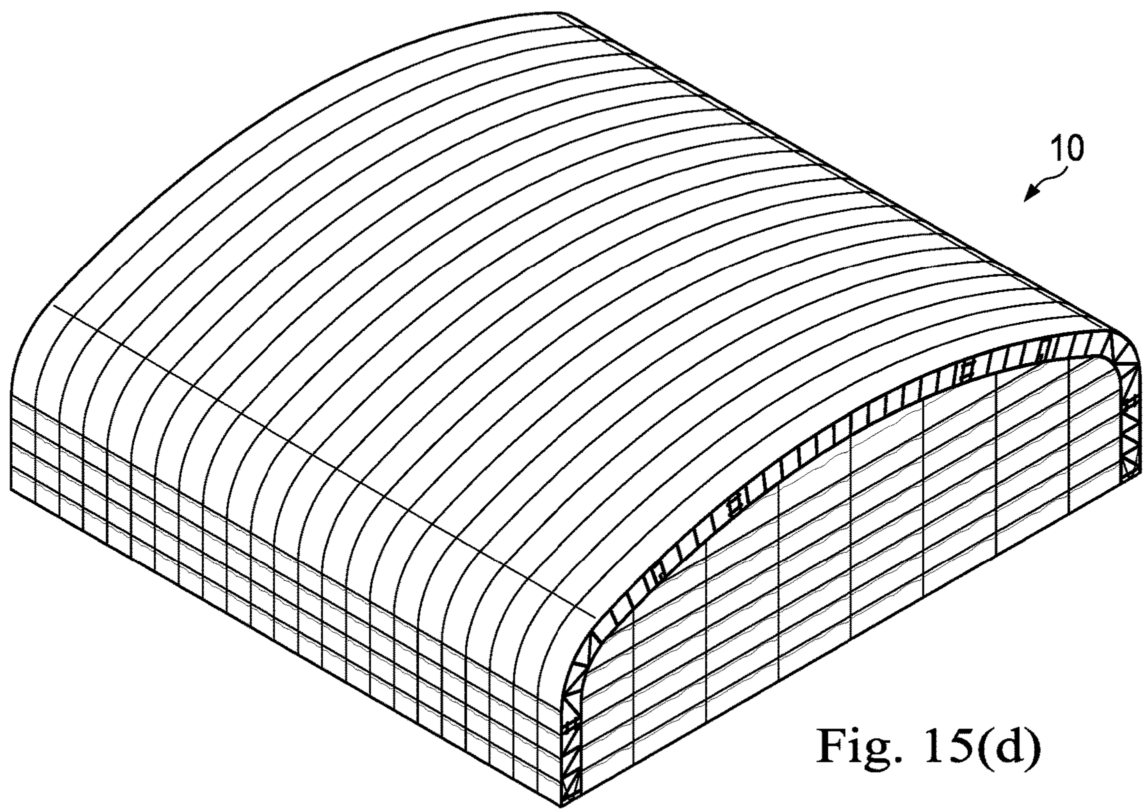

Referring to FIGS. 13 and 14 with continuing reference to FIGS. 1-11 and 12(*a*)-(*f*), the blast resistant shelter 10 is illustrated in an assembled state. The wall 18*a* of the blast resistant shelter 10 includes the trusses 22, the base beams 38, the wall girts 52*a-h*, and a plurality of wall girts substantially identical to the wall girts 52*a-h*. The wall girts 52*a-h* and the plurality of wall girts substantially identical to the wall girts 52*a-h* are referred to collectively in FIG. 13 as wall girts 52 (i.e., the suffixes "a-h" are omitted). The wall girts 52 are connected to, and interposed between, the trusses 22 in substantially the same manner as that described above with respect to the wall girts 52*a-h*. In addition, the wall 18*a* of the blast resistant shelter 10 includes the blast panels 56*a-h* and a plurality of blast panels substantially identical to the blast panels 56*a-h*. The blast panels 56*a-h* and the plurality of blast panels substantially identical to the blast panels 56*a-h* are referred to collectively in FIG. 14 as blast panels 56 (i.e., the suffixes "a-h" are omitted). The blast panels 56 define part of the canopy 14, and are pivotably mounted to the wall girts 52 in substantially the same manner as that described above with respect to the blast panels 56*a-h*. The wall 18*b* of the blast resistant shelter 10 is substantially identical to the wall 18*a*, and therefore will not be described in further detail.

Turning to FIG. 13, the gable end 20*a* of the blast resistant shelter 10 includes a plurality of structural members such as, for example, trusses 66. The trusses 66 are spaced apart by a dimension D2. In some embodiments, the dimension D2 is approximately 8'. In some embodiments, the trusses 66 are spaced apart in a substantially parallel relation. The trusses 66 are interconnected at lower end portions thereof by structural members such as, for example, base beams 68, which maintain the substantially parallel spacing of the trusses 66. Moreover, the trusses 66 are interconnected at upper end portions thereof by one or more of the trusses 22. The trusses 66 are identical in many respects to the trusses 22, except that the trusses 66 extend vertically at the gable end 20*a* of the blast resistant shelter 10 between the base beams 68 and one or more of the trusses 22. Likewise, the trusses 66 are anchored to the ground in a manner substantially identical to that described above with respect to the trusses 22. Further, a plurality of structural members such as, for example, wall girts 70 are coupled to the trusses 66 in substantially the same manner as the manner in which the wall girts 52*a-h* are coupled to the trusses 22. The wall girts 70 are substantially identical to the wall girts 52*a-h*, except that, in some embodiments, the dimensions of the wall girts 70 are different than the dimensions of the wall girts 52*a-h*. For example, in some embodiments, at least a portion of the wall girts 70 are about 8' and at least a portion of the wall girts 52*a-h* are about 4'.

Turning to FIG. 14, the gable end 20*a* of the blast resistant shelter 10 further includes a plurality of blast panels 72 defining part of the canopy 14. The blast panels 72 are substantially identical to the blast panels 56*a-h*, except that, in some embodiments, the dimensions of the blast panels 72 are different than the dimensions of the blast panels 56*a-h*. More particularly, in some embodiments, at least a portion of the blast panels 72 are 8'2" wide and at least a portion of the blast panels 56*a-h* are 4'2" wide. In addition, at least a portion of the blast panels 72 are pivotably mounted to the truss 22 at the gable end 20*a* and adapted to pivot thereabout in response to the blast wave 64. The remainder of the blast panels 72 are pivotably mounted to the wall girts 70, respectively, and adapted to pivot thereabout in response to the blast wave 64. The manner in which the blast panels 72 are retained on the wall girts 70 is substantially identical to the manner in which the blast panels 56*a-h* are retained on the wall girts 52*a-h*, respectively. Likewise, the blast panels 72 are detachably connected to the blast resistant shelter 10 in a manner that is substantially identical to that described above with respect to the blast panels 56*a-h* (i.e., via the fasteners 60*a-h*, 62*aa*, 62*ab*, 62*ac*, 62*bb*, 62*ba*, 62*bc*, 62*ca*, 62*cb*, 62*cc*, 62*da*, 62*db*, or 62*dc*). The gable end 20*b* of the blast resistant shelter 10 is substantially identical to the gable end 20*a*, and therefore will not be described in further detail.

The roof 16 of the canopy 14 extends at least partially over the walls 18*a* and 18*b* of the canopy 14 and is connected to the uppermost row of the blast panels 56 via fastener(s) (not shown). Likewise, the roof 16 of the canopy 14 extends at least partially over the gable ends 20*a* and 20*b* of the canopy 14 and is connected to the uppermost row of the blast panels 72 via fastener(s) (not shown). The fastener(s) via which the roof 16 of the canopy 14 is connected to the uppermost rows of the blast panels 56 and 72 may include, but are not limited to, hook-and-loop fasteners, snaps, buttons, magnets, buckles, tape, adhesive, or the like; such fastener(s) may also include a heat activated adhesive so as to be iron-able onto the roof 16 of the canopy 14 and/or the uppermost rows of the blast panels 56 and 72.

In operation, as illustrated in FIGS. 15(*a*)-(*d*) with continuing reference to FIGS. 1-11, 12(*a*)-(*f*), 13, and 14, when the blast resistant shelter 10 encounters the blast wave 64, the blast panels 56 flap open to permit passage of the blast wave 64 through the wall 18*a*. Moreover, the blast panels 72 flap open to permit passage of the blast wave 64 through the gable end 20*a*. In a similar manner, blast panels of the wall 18*b* and the gable end 20*b* flap open to permit passage of the blast wave 64 through the wall 18*b* and the gable end 20*b*. As a result of the flapping open of the blast panels 56 and 72, the wall 18*b*'s blast panels, and the gable end 20*b*'s blast panels, passage of the blast wave 64 is permitted through the interior of the blast resistant shelter 10, thus reducing the overall load imparted on the frame 12 of the blast resistant shelter 10. As a result, the blast resistant shelter 10 is able to withstand the blast wave 64 without significant structural damage or collapse. FIGS. 15(*a*)-(*d*) are time-lapse views of the blast panels 56 and 72, the wall 18*b*'s blast panels, and the gable end 20*b*'s blast panels encountering the blast wave 64. As shown in FIG. 15(*a*), in a first operational configuration, the blast panels 56 and 72, the wall 18*b*'s blast panels, and the gable end 20*b*'s blast panels are detachably connected to respective portions (discussed above) of the blast resistant shelter 10 and prevented from pivoting about the wall girts so that the blast panels 56*a-h* prevent, or at least reduce, air flow through the blast resistant shelter 10. As shown in FIGS. 15(*b*)-(*d*), in a second operational configuration, in response to the blast wave 64, the blast panels 56 and 72, the wall 18*b*'s blast panels, and the gable end 20*b*'s blast panels are detached from the respective portions of the blast resistant shelter 10 and permitted to pivot about the wall girts so that air flow is permitted through the blast resistant shelter 10.

Figure 16A:
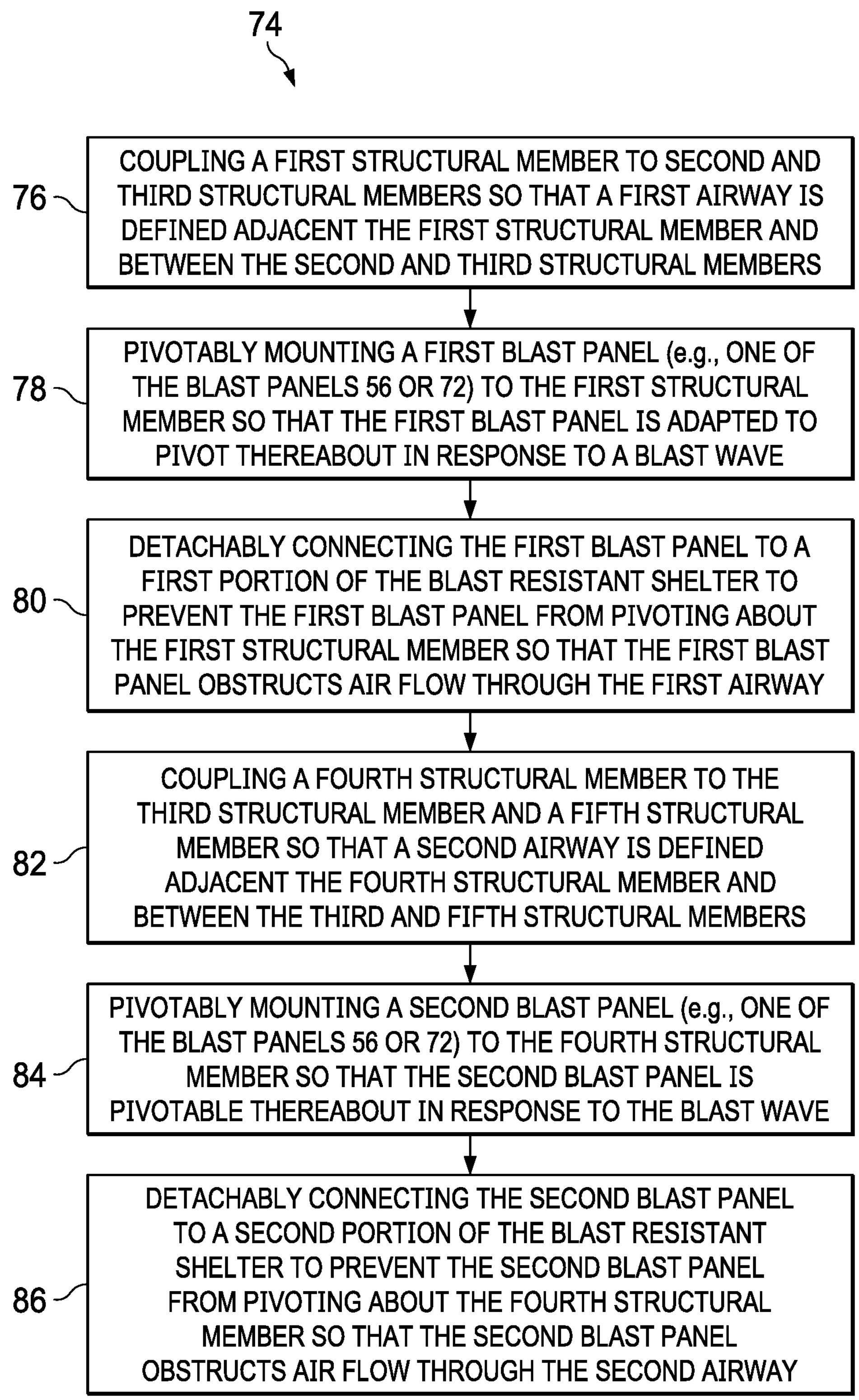
FIGS. 16(*a*)-(*c*) are flow chart views of a method for assembling the blast resistant shelter, according to one or more embodiments of the present disclosure.
Figure 16B:
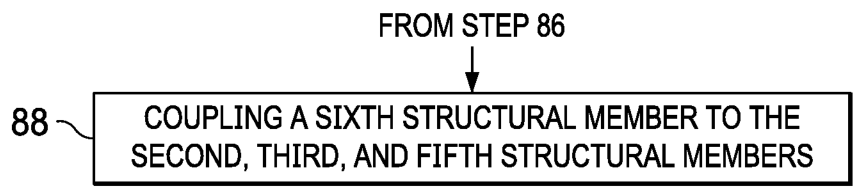
Figure 16C:
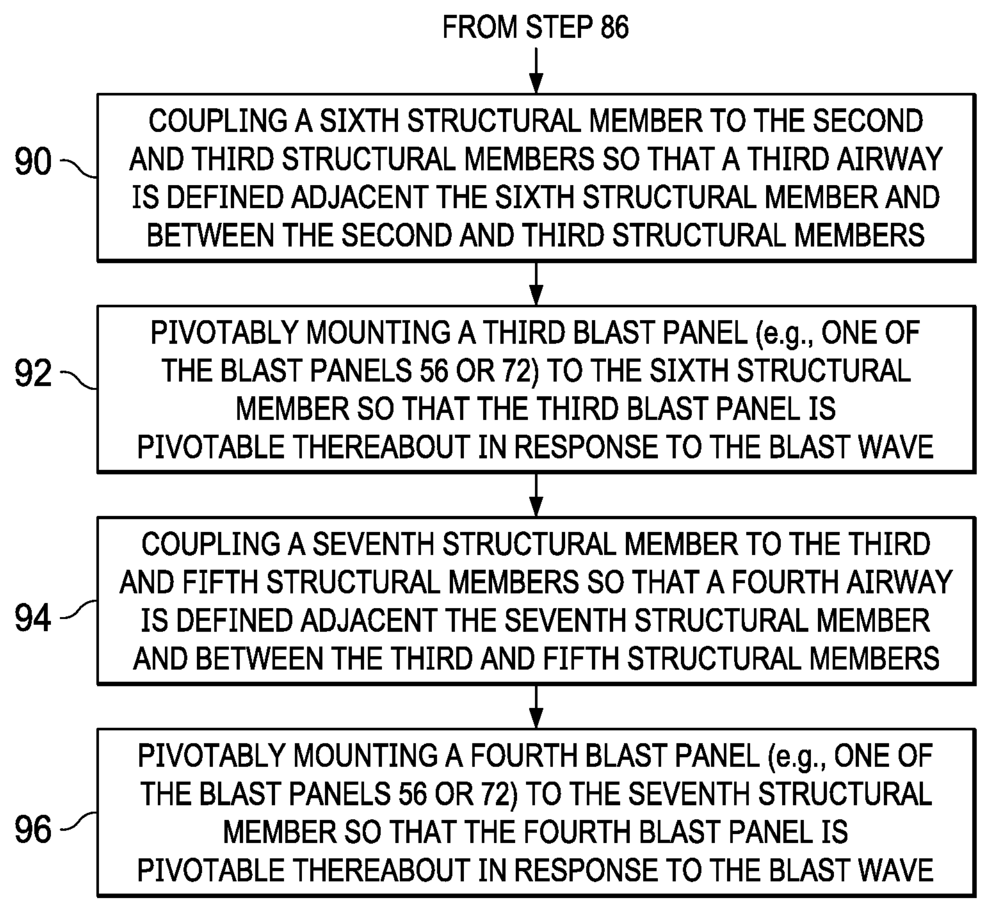

Referring to FIGS. 16(*a*)-(*c*) with continuing reference to FIGS. 1-11 and 12(*a*)-(*f*), 13, 14, and 15(*a*)-(*d*), a method of assembling the blast resistant shelter 10 is generally referred to by the reference numeral 74. Turning to FIG. 16(*a*), the method 74 includes coupling a first structural member to second and third structural members so that a first airway is defined adjacent the first structural member and between the second and third structural members at a step 76, pivotably mounting a first blast panel (e.g., one of the blast panels 56 or 72) to the first structural member so that the first blast panel is adapted to pivot thereabout in response to a blast wave at a step 78, detachably connecting the first blast panel to a first portion of the blast resistant shelter to prevent the first blast panel from pivoting about the first structural member so that the first blast panel obstructs air flow through the first airway at a step 80, coupling a fourth structural member to the third structural member and a fifth structural member so that a second airway is defined adjacent the fourth structural member and between the third and fifth structural members at a step 82, pivotably mounting a second blast panel (e.g., one of the blast panels 56 or 72) to the fourth structural member so that the second blast panel is pivotable thereabout in response to the blast wave at a step 84, and detachably connecting the second blast panel to a second portion of the blast resistant shelter to prevent the second blast panel from pivoting about the fourth structural member so that the second blast panel obstructs air flow through the second airway at a step 86. In response to the blast wave: the first blast panel is detachable from the first portion of the blast resistant shelter and permitted to pivot about the first structural member so that air flow is permitted through the first airway, and the second blast panel is detachable from the second portion of the blast resistant shelter and permitted to pivot about the fourth structural member so that air flow is permitted through the second airway. In some embodiments of the steps 76 and 82, either: the first and fourth structural members are respective ones of the wall girts 52 or 70, and the second, third, and fifth structural members are respective ones of the trusses 22 or 66; or the first and fourth structural members form one of the trusses 22 or 66. In some embodiments of the step 80, the first portion of the blast resistant shelter includes one or more of: the second blast panel, the second structural member, and the third structural member. In some embodiments of the step 86, the second portion of the blast resistant shelter includes one or more of: the first blast panel, the third structural member, and the fifth structural member.

Turning to FIG. 16(*b*), in some embodiments, the method 74 further includes coupling a sixth structural member to the second, third, and fifth structural members at a step 88. In some embodiments of the step 88, the first portion of the blast resistant shelter includes one or more of: the sixth structural member, the second blast panel, the second structural member, and the third structural member; and the second portion of the blast resistant shelter includes one or more of: the sixth structural member, the first blast panel, the third structural member, and the fifth structural member. In some embodiments of the steps 76 and 82, either: the first and fourth structural members are respective ones of the wall girts 52 or 70, the second, third, and fifth structural members are respective ones of the trusses 22 or 66, and the sixth structural member is the base beam 38 or 68; or the first and fourth structural members form one of the trusses 22 or 66.

Turning to FIG. 16(*c*), alternatively, in some embodiments, the step 88 is omitted and the method 74 further includes coupling a sixth structural member to the second and third structural members so that a third airway is defined adjacent the sixth structural member and between the second and third structural members at a step 90, pivotably mounting a third blast panel (e.g., one of the blast panels 56 or 72) to the sixth structural member so that the third blast panel is pivotable thereabout in response to the blast wave at a step 92, coupling a seventh structural member to the third and fifth structural members so that a fourth airway is defined adjacent the seventh structural member and between the third and fifth structural members at a step 94, and pivotably mounting a fourth blast panel (e.g., one of the blast panels 56 or 72) to the seventh structural member so that the fourth blast panel is pivotable thereabout in response to the blast wave at a step 96. In some embodiments of the steps 90 and 92, the first portion of the blast resistant shelter includes one or more of: the third blast panel, the sixth structural member, the second blast panel, the second structural member, and the third structural member. In some embodiments of the steps 94 and 96, the second portion of the blast resistant shelter includes one or more of: the fourth blast panel, the seventh structural member, the first blast panel, the third structural member, and the fifth structural member. In some embodiments of the steps 76, 82, 90, and 94, either: the first, fourth, sixth, and seventh structural members are respective ones of the wall girts 52 or 70, and the second, third, and fifth structural members are respective ones of the trusses 22 or 66; or the first and fourth structural members form one of the trusses 22 or 66, and the sixth and seventh structural members form another one of the trusses 22 or 66.

In some embodiments, the blast resistant shelter 10 complies with industry standards including the API's Recommended Practice 756, and so may be used to accommodate personnel at or near a process unit during a turnaround. In some embodiments, the blast resistant shelter 10 complies with industry standards including the API's Recommended Practice 756 when the width W is approximately 60', the height H is approximately 20', the radius R is approximately 64'. In some embodiments, the blast resistant shelter 10 complies with industry standards including the API's Recommended Practice 756 when the width W is less than 60', the height H is less than 20', the radius R is less than 64'. In some experimental embodiments, decreasing the width W below 60', decreasing the height H below 20', and/or decreasing the radius R below 64' strengthens the blast resistant shelter 10 to comply even more favorably with industry standards including the API's Recommended Practice 756. In some embodiments, the blast resistant shelter 10 is able to withstand structural loads imparted by a blast wave emanating from the process unit. More particularly, the detachability and pivotability of the blast panels (e.g., the blast panels 56 and 72) in response to the blast wave 64 decreases the load imparted on the frame 12 by the blast wave 64 and decreases the uplift exerted on the blast resistant shelter 10 by the blast wave 64 (by at least half in some embodiments), thereby preventing significant structural damage or collapse. In some embodiments, such a decrease in the load imparted on the frame 12 by the blast wave 64 and/or the uplift exerted on the blast resistant shelter 10 by the blast wave 64 negates the requirement for costly additional anchoring of the frame.

In some embodiments, the blast resistant shelter 10 is able to withstand structural loads imparted by a blast wave measuring greater than 4 PSI. In some embodiments, the blast resistant shelter 10 is able to withstand structural loads imparted by a blast wave measuring at least 5 PSI. In some embodiments, the blast resistant shelter 10 is able to withstand structural loads imparted by a blast wave measuring at least 6 PSI. In some embodiments, the blast resistant shelter 10 is able to withstand structural loads imparted by a blast wave measuring greater than 5 PSI. In some embodiments, the blast resistant shelter 10 is able to withstand structural loads imparted by a blast wave measuring between 5 and 8 PSI.

The present disclosure refers to the API's Recommended Practice 756, the entire disclosure of which is hereby incorporated herein by reference.

In a first aspect, the present disclosure introduces a blast resistant shelter, including first and second trusses; a first wall girt coupled to, and extending between, the first and second trusses; a first airway defined adjacent the first wall girt and between the first and second trusses; and a first blast panel pivotably mounted to the first wall girt and adapted to pivot thereabout in response to a blast wave. In some embodiments, in a first operational configuration, the first blast panel is detachably connected to a first portion of the blast resistant shelter and prevented from pivoting about the first wall girt so that the first blast panel prevents, or at least reduces, air flow through the first airway; and, in a second operational configuration, in response to the blast wave, the first blast panel is detached from the first portion of the blast resistant shelter and permitted to pivot about the first wall girt so that air flow is permitted through the first airway. In some embodiments, the first portion of the blast resistant shelter includes one or more of: the first truss and the second truss. In some embodiments, the blast resistant shelter further includes a base beam to which the first and second trusses are coupled; wherein the first portion of the blast resistant shelter includes one or more of: the base beam, the first truss, and the second truss. In some embodiments, the blast resistant shelter further includes a second wall girt coupled to, and extending between, the first and second trusses; a second airway defined adjacent the second wall girt and between the first and second trusses; and a second blast panel pivotably mounted to the second wall girt and adapted to pivot thereabout in response to the blast wave; wherein the first portion of the blast resistant shelter includes one or more of: the second blast panel, the second wall girt, the first truss, and the second truss. In some embodiments, the blast resistant shelter further includes a third truss; a second wall girt coupled to, and extending between, the second and third trusses; a second airway defined adjacent the second wall girt and between the second and third trusses; and a second blast panel pivotably mounted to the second wall girt and adapted to pivot thereabout in response to the blast wave. In some embodiments, the first and second wall girts are integrally formed as a single continuous component. In some embodiments, in a first operational configuration: the first blast panel is detachably connected to a first portion of the blast resistant shelter and prevented from pivoting about the first wall girt so that the first blast panel prevents, or at least reduces, air flow through the first airway; and the second blast panel is detachably connected to a second portion of the blast resistant shelter and prevented from pivoting about the second wall girt so that the second blast panel prevents, or at least reduces, air flow through the second airway; and, in a second operational configuration, in response to the blast wave: the first blast panel is detached from the first portion of the blast resistant shelter and permitted to pivot about the first wall girt so that air flow is permitted through the first airway; and the second blast panel is detached from the second portion of the blast resistant shelter and permitted to pivot about the second wall girt so that air flow is permitted through the second airway. In some embodiments, the first portion of the blast resistant shelter includes one or more of: the second blast panel, the first truss, and the second truss; and the second portion of the blast resistant shelter includes one or more of: the first blast panel, the second truss, and the third truss. In some embodiments, the blast resistant shelter further includes a base beam to which the first, second, and third trusses are coupled; wherein the first portion of the blast resistant shelter includes one or more of: the base beam, the second blast panel, the first truss, and the second truss; and wherein the second portion of the blast resistant shelter includes one or more of: the base beam, the first blast panel, the second truss, and the third truss. In some embodiments, the blast resistant shelter further includes a third wall girt coupled to, and extending between, the first and second trusses; a fourth wall girt coupled to, and extending between, the second and third trusses; a third airway defined adjacent the third wall girt and between the first and second trusses; a fourth airway defined adjacent the fourth wall girt and between the second and third trusses; a third blast panel pivotably mounted to the third wall girt and adapted to pivot thereabout in response to the blast wave; and a fourth blast panel pivotably mounted to the fourth wall girt and adapted to pivot thereabout in response to the blast wave; wherein the first portion of the blast resistant shelter includes one or more of: the third blast panel, the third wall girt, the second blast panel, the first truss, and the second truss; and wherein the second portion of the blast resistant shelter includes one or more of: the fourth blast panel, the fourth wall girt, the first blast panel, the second truss, and the third truss. In some embodiments, the first and second wall girts are integrally formed as a single continuous component; and the third and fourth wall girts are integrally formed as a single continuous component.

In a second aspect, the present disclosure introduces a method of assembling a blast resistant shelter, the method including coupling a first wall girt to first and second trusses so that a first airway is defined adjacent the first wall girt and between the first and second trusses; and pivotably mounting a first blast panel to the first wall girt so that the first blast panel is adapted to pivot thereabout in response to a blast wave. In some embodiments, the method further includes detachably connecting the first blast panel to a first portion of the blast resistant shelter to prevent the first blast panel from pivoting about the first wall girt so that the first blast panel prevents, or at least reduces, air flow through the first airway; wherein, in response to the blast wave, the first blast panel is detachable from the first portion of the blast resistant shelter and permitted to pivot about the first wall girt so that air flow is permitted through the first airway. In some embodiments, the first portion of the blast resistant shelter includes one or more of: the first truss and the second truss. In some embodiments, the blast resistant shelter further includes a base beam to which the first and second trusses are coupled; and the first portion of the blast resistant shelter includes one or more of: the base beam, the first truss, and the second truss. In some embodiments, the method further includes coupling a second wall girt to the first and second trusses so that a second airway is defined adjacent the second wall girt and between the first and second trusses; and pivotably mounting a second blast panel to the second wall girt so that the second blast panel is pivotable thereabout in response to the blast wave; wherein the first portion of the blast resistant shelter includes one or more of: the second blast panel, the second wall girt, the first truss, and the second truss. In some embodiments, the method further includes coupling a second wall girt to the second truss and a third truss so that a second airway is defined adjacent the second wall girt and between the second and third trusses; and pivotably mounting a second blast panel to the second wall girt so that the second blast panel is pivotable thereabout in response to the blast wave. In some embodiments, the first and second wall girts are integrally formed as a single continuous component. In some embodiments, the method further includes detachably connecting the first blast panel to a first portion of the blast resistant shelter to prevent the first blast panel from pivoting about the first wall girt so that the first blast panel prevents, or at least reduces, air flow through the first airway; and detachably connecting the second blast panel to a second portion of the blast resistant shelter to prevent the second blast panel from pivoting about the second wall girt so that the second blast panel prevents, or at least reduces, air flow through the second airway; wherein, in response to the blast wave: the first blast panel is detachable from the first portion of the blast resistant shelter and permitted to pivot about the first wall girt so that air flow is permitted through the first airway; and the second blast panel is detachable from the second portion of the blast resistant shelter and permitted to pivot about the second wall girt so that air flow is permitted through the second airway. In some embodiments, the first portion of the blast resistant shelter includes one or more of: the second blast panel, the first truss, and the second truss; and the second portion of the blast resistant shelter includes one or more of: the first blast panel, the second truss, and the third truss. In some embodiments, the blast resistant shelter further includes a base beam to which the first, second, and third trusses are coupled; the first portion of the blast resistant shelter includes one or more of: the base beam, the second blast panel, the first truss, and the second truss; and the second portion of the blast resistant shelter includes one or more of: the base beam, the first blast panel, the second truss, and the third truss. In some embodiments, the method further includes coupling a third wall girt to the first and second trusses so that a third airway is defined adjacent the third wall girt and between the first and second trusses; pivotably mounting a third blast panel to the third wall girt so that the third blast panel is pivotable thereabout in response to the blast wave; coupling a fourth wall girt to the second and third trusses so that a fourth airway is defined adjacent the fourth wall girt and between the second and third trusses; and pivotably mounting a fourth blast panel to the fourth wall girt so that the fourth blast panel is pivotable thereabout in response to the blast wave; wherein the first portion of the blast resistant shelter includes one or more of: the third blast panel, the third wall girt, the second blast panel, the first truss, and the second truss; and wherein the second portion of the blast resistant shelter includes one or more of: the fourth blast panel, the fourth wall girt, the first blast panel, the second truss, and the third truss. In some embodiments, the first and second wall girts are integrally formed as a single continuous component; and the third and fourth wall girts are integrally formed as a single continuous component.

In a third aspect, the present disclosure introduces a blast resistant shelter, including first and second structural members; a third structural member coupled to, and extending between, the first and second structural members; a first airway defined adjacent the third structural member and between the first and second structural members; and a first blast panel pivotably mounted to the third structural member and adapted to pivot thereabout in response to a blast wave. In some embodiments, in a first operational configuration, the first blast panel is detachably connected to a first portion of the blast resistant shelter and prevented from pivoting about the third structural member so that the first blast panel prevents, or at least reduces, air flow through the first airway; and in a second operational configuration, in response to the blast wave, the first blast panel is detached from the first portion of the blast resistant shelter and permitted to pivot about the third structural member so that air flow is permitted through the first airway. In some embodiments, the first portion of the blast resistant shelter includes one or more of: the first structural member and the second structural member. In some embodiments, the blast resistant shelter further includes a fourth structural member to which the first and second structural members are coupled; wherein the first portion of the blast resistant shelter includes one or more of: the fourth structural member, the first structural member, and the second structural member. For example, either: the first and second structural members are trusses, the third structural member is a wall girt, and the fourth structural member is a base beam; or the third structural member is a truss. In some embodiments, the blast resistant shelter further includes a fourth structural member coupled to, and extending between, the first and second structural members; a second airway defined adjacent the fourth structural member and between the first and second structural members; and a second blast panel pivotably mounted to the fourth structural member and adapted to pivot thereabout in response to the blast wave; wherein the first portion of the blast resistant shelter includes one or more of: the second blast panel, the fourth structural member, the first structural member, and the second structural member. For example, either: the first and second structural members are trusses, and the third and fourth structural members are wall girts; or the third structural member is a truss. In some embodiments, the blast resistant shelter further includes a fourth structural member; a fifth structural member coupled to, and extending between, the second and fourth structural members; a second airway defined adjacent the fifth structural member and between the second and fourth structural members; and a second blast panel pivotably mounted to the fifth structural member and adapted to pivot thereabout in response to the blast wave. In some embodiments, the third and fifth structural members are integrally formed as a single continuous component. In some embodiments, in a first operational configuration: the first blast panel is detachably connected to a first portion of the blast resistant shelter and prevented from pivoting about the third structural member so that the first blast panel prevents, or at least reduces, air flow through the first airway; and the second blast panel is detachably connected to a second portion of the blast resistant shelter and prevented from pivoting about the fifth structural member so that the second blast panel prevents, or at least reduces, air flow through the second airway; and, in a second operational configuration, in response to the blast wave: the first blast panel is detached from the first portion of the blast resistant shelter and permitted to pivot about the third structural member so that air flow is permitted through the first airway; and the second blast panel is detached from the second portion of the blast resistant shelter and permitted to pivot about the fifth structural member so that air flow is permitted through the second airway. In some embodiments, the first portion of the blast resistant shelter includes one or more of: the second blast panel, the first structural member, and the second structural member; and the second portion of the blast resistant shelter includes one or more of: the first blast panel, the second structural member, and the fourth structural member. For example, either: the first, second, and fourth structural members are trusses, and the third and fifth structural members are wall girts; or the third and fifth structural members form a truss. In some embodiments, the blast resistant shelter further includes a sixth structural member to which the first, second, and fourth structural members are coupled; wherein the first portion of the blast resistant shelter includes one or more of: the sixth structural member, the second blast panel, the first structural member, and the second structural member; and wherein the second portion of the blast resistant shelter includes one or more of: the sixth structural member, the first blast panel, the second structural member, and the fourth structural member. For example, either: the first, second, and fourth structural members are trusses, the third and fifth structural members are wall girts, and the sixth structural member is a base beam; or the third and fifth structural members form a truss. In some embodiments, the blast resistant shelter further includes a sixth structural member coupled to, and extending between, the first and second structural members; a seventh structural member coupled to, and extending between, the second and fourth structural members; a third airway defined adjacent the sixth structural member and between the first and second structural members; a fourth airway defined adjacent the seventh structural member and between the second and fourth structural members; a third blast panel pivotably mounted to the sixth structural member and adapted to pivot thereabout in response to the blast wave; and a fourth blast panel pivotably mounted to the seventh structural member and adapted to pivot thereabout in response to the blast wave; wherein the first portion of the blast resistant shelter includes one or more of: the third blast panel, the sixth structural member, the second blast panel, the first structural member, and the second structural member; and wherein the second portion of the blast resistant shelter includes one or more of: the fourth blast panel, the seventh structural member, the first blast panel, the second structural member, and the fourth structural member. In some embodiments, the third and fifth structural members are integrally formed as a single continuous component; and the sixth and seventh structural members are integrally formed as a single continuous component. For example, either: the first, second, and fourth structural members are trusses and the third, fifth, sixth, and seventh structural members are wall girts; or the third and fifth structural members form a truss, and the sixth and seventh structural members form a truss.

In a fourth aspect, the present disclosure introduces method of assembling a blast resistant shelter, the method including coupling a first structural member to second and third structural members so that a first airway is defined adjacent the first structural member and between the second and third structural members; and pivotably mounting a first blast panel to the first structural member so that the first blast panel is adapted to pivot thereabout in response to a blast wave. In some embodiments, the method further includes detachably connecting the first blast panel to a first portion of the blast resistant shelter to prevent the first blast panel from pivoting about the first structural member so that the first blast panel prevents, or at least reduces, air flow through the first airway; wherein, in response to the blast wave, the first blast panel is detachable from the first portion of the blast resistant shelter and permitted to pivot about the first structural member so that air flow is permitted through the first airway. In some embodiments, the first portion of the blast resistant shelter includes one or more of: the second structural member and the third structural member. In some embodiments, the blast resistant shelter further includes a fourth structural member to which the second and third structural members are coupled; and the first portion of the blast resistant shelter includes one or more of: the fourth structural member, the second structural member, and the third structural member. For example, either: the first structural member is a wall girt, the second and third structural members are trusses, and the fourth structural member is a base beam; or the first structural member is a truss. In some embodiments, the method further includes coupling a fourth structural member to the second and third structural members so that a second airway is defined adjacent the fourth structural member and between the second and third structural members; and pivotably mounting a second blast panel to the fourth structural member so that the second blast panel is pivotable thereabout in response to the blast wave; wherein the first portion of the blast resistant shelter includes one or more of: the second blast panel, the fourth structural member, the second structural member, and the third structural member. For example, either: the first and fourth structural members are wall girts, and the second and third structural members are trusses; or the first structural member is a truss. In some embodiments, the method further includes coupling a fourth structural member to the third structural member and a fifth structural member so that a second airway is defined adjacent the fourth structural member and between the third and fifth structural members; and pivotably mounting a second blast panel to the fourth structural member so that the second blast panel is pivotable thereabout in response to the blast wave. In some embodiments, the first and fourth structural members are integrally formed as a single continuous component. In some embodiments, the method further includes detachably connecting the first blast panel to a first portion of the blast resistant shelter to prevent the first blast panel from pivoting about the first structural member so that the first blast panel prevents, or at least reduces, air flow through the first airway; and detachably connecting the second blast panel to a second portion of the blast resistant shelter to prevent the second blast panel from pivoting about the fourth structural member so that the second blast panel prevents, or at least reduces, air flow through the second airway; wherein, in response to the blast wave: the first blast panel is detachable from the first portion of the blast resistant shelter and permitted to pivot about the first structural member so that air flow is permitted through the first airway; and the second blast panel is detachable from the second portion of the blast resistant shelter and permitted to pivot about the fourth structural member so that air flow is permitted through the second airway. In some embodiments, the first portion of the blast resistant shelter includes one or more of: the second blast panel, the second structural member, and the third structural member; and the second portion of the blast resistant shelter includes one or more of: the first blast panel, the third structural member, and the fifth structural member. For example, either: the first and fourth structural members are wall girts, and the second, third, and fifth structural members are trusses; or the first and fourth structural members form a truss. In some embodiments, the blast resistant shelter further includes a sixth structural member to which the second, third, and fifth structural members are coupled; the first portion of the blast resistant shelter includes one or more of: the sixth structural member, the second blast panel, the second structural member, and the third structural member; and the second portion of the blast resistant shelter includes one or more of: the sixth structural member, the first blast panel, the third structural member, and the fifth structural member. For example, either: the first and fourth structural members are wall girts, the second, third, and fifth structural members are trusses, and the sixth structural member is a base beam; or the first and fourth structural members form a truss. In some embodiments, the method further includes coupling a sixth structural member to the second and third structural members so that a third airway is defined adjacent the sixth structural member and between the second and third structural members; pivotably mounting a third blast panel to the sixth structural member so that the third blast panel is pivotable thereabout in response to the blast wave; coupling a seventh structural member to the third and fifth structural members so that a fourth airway is defined adjacent the seventh structural member and between the third and fifth structural members; and pivotably mounting a fourth blast panel to the seventh structural member so that the fourth blast panel is pivotable thereabout in response to the blast wave; wherein the first portion of the blast resistant shelter includes one or more of: the third blast panel, the sixth structural member, the second blast panel, the second structural member, and the third structural member; and wherein the second portion of the blast resistant shelter includes one or more of: the fourth blast panel, the seventh structural member, the first blast panel, the third structural member, and the fifth structural member. In some embodiments, the first and fourth structural members are integrally formed as a single continuous component; and the sixth and seventh structural members are integrally formed as a single continuous component. For example, either: the first, fourth, sixth, and seventh structural members are wall girts, and the second, third, and fifth structural members are trusses; or the first and fourth structural members form a truss, and the sixth and seventh structural members form a truss.

It is understood that variations may be made in the foregoing without departing from the scope of the present disclosure.

In some embodiments, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In some embodiments, while different steps, processes, and procedures are described as appearing as distinct acts, one or more of the steps, one or more of the processes, and/or one or more of the procedures may also be performed in different orders, simultaneously and/or sequentially. In some embodiments, the steps, processes, and/or procedures may be merged into one or more steps, processes and/or procedures.

In some embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although some embodiments have been described in detail above, the embodiments described are illustrative only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

What is claimed is:

1. A blast resistant shelter, comprising:

a frame comprising first, second, third, and fourth structural members, wherein the third structural member is coupled to, and extends between, the first and second structural members so that a first airway is defined adjacent the third structural member, and between the first and second structural members, and wherein the fourth structural member is coupled to the first structural member so that a second airway is defined adjacent the fourth structural member;

a first blast panel pivotably mounted to the third structural member so that the first blast panel is adapted to pivot about the third structural member in response to a blast wave; and a second blast panel pivotably mounted to the fourth structural member so that the second blast panel is adapted to pivot about the fourth structural member in response to the blast wave;

wherein the blast resistant shelter is actuable between:

a first configuration in which:

the first blast panel is detachably connected via a first fastener to a first portion of the blast resistant shelter and prevented from pivoting about the third structural member so that the first blast panel prevents, or at least reduces, air flow through the first airway; and the second blast panel is detachably connected via a second fastener to a second portion of the blast resistant shelter and prevented from pivoting about the fourth structural member so that the second blast panel prevents, or at least reduces, air flow through the second airway;

and a second configuration in which, in response to the blast wave:

the first blast panel is detached via disconnection of the first fastener from the first portion of the blast resistant shelter and permitted to pivot about the third structural member so that air flow is permitted through the first airway; and the second blast panel is detached via disconnection of the second fastener from the second portion of the blast resistant shelter and permitted to pivot about the fourth structural member so that air flow is permitted through the second airway;

and wherein the first portion of the blast resistant shelter to which the first blast panel is detachably connected via the first fastener in the first configuration comprises the second blast panel.

2. The blast resistant shelter of claim 1, wherein the disconnection of the first fastener and thus the pivoting of the first blast panel about the third structural member is independent of the disconnection of the second fastener and thus the pivoting of the second blast panel about the fourth structural member.

3. The blast resistant shelter of claim 1, wherein the first blast panel is a first nonrigid blast panel; and wherein the second blast panel is a second nonrigid blast panel.

4. The blast resistant shelter of claim 1, wherein the fourth structural member is coupled to the second structural member, and extends between the first and second structural members so that the second airway is defined between the first and second structural members.

5. The blast resistant shelter of claim 4, wherein the frame further comprises fifth, sixth, and seventh structural members, the sixth and seventh structural members being coupled to, and extending between, the second and fifth structural members so that third and fourth airways are defined adjacent the sixth and seventh structural members, respectively, and between the second and fifth structural members;

wherein the blast resistant shelter further comprises:

a third blast panel pivotably mounted to the sixth structural member so that the third blast panel is adapted to pivot about the sixth structural member in response to the blast wave; and a fourth blast panel pivotably mounted to the seventh structural member so that the fourth blast panel is adapted to pivot about the seventh structural member in response to the blast wave;

wherein, in the first configuration of the blast resistant shelter:

the third blast panel is detachably connected via a third fastener to a third portion of the blast resistant shelter and prevented from pivoting about the sixth structural member so that the third blast panel prevents, or at least reduces, air flow through the third airway; and the fourth blast panel is detachably connected via a fourth fastener to a fourth portion of the blast resistant shelter and prevented from pivoting about the seventh structural member so that the fourth blast panel prevents, or at least reduces, air flow through the fourth airway;

and wherein, in the second configuration of the blast resistant shelter:

the third blast panel is detached via disconnection of the third fastener from the third portion of the blast resistant shelter and permitted to pivot about the sixth structural member so that air flow is permitted through the third airway; and the fourth blast panel is detached via disconnection of the fourth fastener from the fourth portion of the blast resistant shelter and permitted to pivot about the seventh structural member so that air flow is permitted through the fourth airway.

6. The blast resistant shelter of claim 5, wherein the disconnections of the first, second, third, and fourth fasteners and thus the pivoting of the first, second, third, and fourth blast panels about the third, fourth, sixth, and seventh structural members, respectively, are independent of each other.

7. The blast resistant shelter of claim 4, wherein the frame further comprises fifth, sixth, seventh, and eighth structural members, the seventh and eighth structural members being coupled to, and extending between, the fifth and sixth structural members so that third and fourth airways are defined adjacent the seventh and eighth structural members, respectively, and between the fifth and sixth structural members;

wherein the blast resistant shelter further comprises a gable, the gable comprising:

a third blast panel pivotably mounted to the seventh structural member so that the third blast panel is adapted to pivot about the seventh structural member in response to the blast wave; and a fourth blast panel pivotably mounted to the eighth structural member so that the fourth blast panel is adapted to pivot about the eighth structural member in response to the blast wave;

wherein, in the first configuration of the blast resistant shelter:

the third blast panel is detachably connected via a third fastener to a third portion of the blast resistant shelter and prevented from pivoting about the seventh structural member so that the third blast panel prevents, or at least reduces, air flow through the third airway; and the fourth blast panel is detachably connected via a fourth fastener to a fourth portion of the blast resistant shelter and prevented from pivoting about the eighth structural member so that the fourth blast panel prevents, or at least reduces, air flow through the fourth airway;

and wherein, in the second configuration of the blast resistant shelter:

the third blast panel is detached via disconnection of the third fastener from the third portion of the blast resistant shelter and permitted to pivot about the seventh structural member so that air flow is permitted through the third airway; and the fourth blast panel is detached via disconnection of the fourth fastener from the fourth portion of the blast resistant shelter and permitted to pivot about the eighth structural member so that air flow is permitted through the fourth airway.

8. The blast resistant shelter of claim 7, wherein the disconnections of the first, second, third, and fourth fasteners and thus the pivoting of the first, second, third, and fourth blast panels about the third, fourth, seventh, and eighth structural members, respectively, are independent of each other.

9. The blast resistant shelter of claim 1, wherein the frame further comprises a fifth structural member;

wherein the fourth structural member is coupled to the fifth structural member, and extends between the first and fifth structural members so that the second airway is defined between the first and fifth structural members.

10. A blast resistant shelter, comprising:

a frame comprising first, second, third, and fourth structural members, the third and fourth structural members being coupled to, and extending between, the first and second structural members so that first and second airways are defined adjacent the third and fourth structural members, respectively, and between the first and second structural members;

a first blast panel pivotably mounted to the third structural member so that the first blast panel is adapted to pivot about the third structural member in response to a blast wave; and a second blast panel pivotably mounted to the fourth structural member so that the second blast panel is adapted to pivot about the fourth structural member in response to the blast wave;

wherein the blast resistant shelter is actuable between:

a first configuration in which:

the first blast panel is detachably connected via a first fastener to a first portion of the blast resistant shelter and prevented from pivoting about the third structural member so that the first blast panel prevents, or at least reduces, air flow through the first airway; and the second blast panel is detachably connected via a second fastener to a second portion of the blast resistant shelter and prevented from pivoting about the fourth structural member so that the second blast panel prevents, or at least reduces, air flow through the second airway;

and a second configuration in which, in response to the blast wave:

the first blast panel is detached via disconnection of the first fastener from the first portion of the blast resistant shelter and permitted to pivot about the third structural member so that air flow is permitted through the first airway; and the second blast panel is detached via disconnection of the second fastener from the second portion of the blast resistant shelter and permitted to pivot about the fourth structural member so that air flow is permitted through the second airway;

wherein the frame further comprises fifth, sixth, and seventh structural members, the sixth and seventh structural members being coupled to, and extending between, the second and fifth structural members so that third and fourth airways are defined adjacent the sixth and seventh structural members, respectively, and between the second and fifth structural members;

wherein the blast resistant shelter further comprises:

a third blast panel pivotably mounted to the sixth structural member so that the third blast panel is adapted to pivot about the sixth structural member in response to the blast wave; and a fourth blast panel pivotably mounted to the seventh structural member so that the fourth blast panel is adapted to pivot about the seventh structural member in response to the blast wave;

wherein, in the first configuration of the blast resistant shelter:

the third blast panel is detachably connected via a third fastener to a third portion of the blast resistant shelter and prevented from pivoting about the sixth structural member so that the third blast panel prevents, or at least reduces, air flow through the third airway; and the fourth blast panel is detachably connected via a fourth fastener to a fourth portion of the blast resistant shelter and prevented from pivoting about the seventh structural member so that the fourth blast panel prevents, or at least reduces, air flow through the fourth airway;

wherein, in the second configuration of the blast resistant shelter:

the third blast panel is detached via disconnection of the third fastener from the third portion of the blast resistant shelter and permitted to pivot about the sixth structural member so that air flow is permitted through the third airway; and the fourth blast panel is detached via disconnection of the fourth fastener from the fourth portion of the blast resistant shelter and permitted to pivot about the seventh structural member so that air flow is permitted through the fourth airway;

wherein the first portion of the blast resistant shelter to which the first blast panel is detachably connected via the first fastener in the first configuration comprises the second blast panel and/or the third blast panel; and wherein the third portion of the blast resistant shelter to which the third blast panel is detachably connected via the third fastener in the first configuration comprises the first blast panel and/or the fourth blast panel.

11. The blast resistant shelter of claim 10, wherein the second portion of the blast resistant shelter to which the second blast panel is detachably connected via the second fastener in the first configuration comprises the fourth blast panel; and wherein the fourth portion of the blast resistant shelter to which the fourth blast panel is detachably connected via the fourth fastener in the first configuration comprises the second blast panel.

12. A blast resistant shelter, comprising:

a frame comprising first, second, third, and fourth structural members, the third and fourth structural members being coupled to, and extending between, the first and second structural members so that first and second airways are defined adjacent the third and fourth structural members, respectively, and between the first and second structural members;

a first blast panel pivotably mounted to the third structural member so that the first blast panel is adapted to pivot about the third structural member in response to a blast wave; and a second blast panel pivotably mounted to the fourth structural member so that the second blast panel is adapted to pivot about the fourth structural member in response to the blast wave;

wherein the blast resistant shelter is actuable between:

a first configuration in which:

the first blast panel is detachably connected via a first fastener to a first portion of the blast resistant shelter and prevented from pivoting about the third structural member so that the first blast panel prevents, or at least reduces, air flow through the first airway; and the second blast panel is detachably connected via a second fastener to a second portion of the blast resistant shelter and prevented from pivoting about the fourth structural member so that the second blast panel prevents, or at least reduces, air flow through the second airway;

and a second configuration in which, in response to the blast wave:

the first blast panel is detached via disconnection of the first fastener from the first portion of the blast resistant shelter and permitted to pivot about the third structural member so that air flow is permitted through the first airway; and the second blast panel is detached via disconnection of the second fastener from the second portion of the blast resistant shelter and permitted to pivot about the fourth structural member so that air flow is permitted through the second airway;

wherein the frame further comprises fifth, sixth, seventh, and eighth structural members, the seventh and eighth structural members being coupled to, and extending between, the fifth and sixth structural members so that third and fourth airways are defined adjacent the seventh and eighth structural members, respectively, and between the fifth and sixth structural members;

wherein the blast resistant shelter further comprises a gable, the gable comprising:

a third blast panel pivotably mounted to the seventh structural member so that the third blast panel is adapted to pivot about the seventh structural member in response to the blast wave; and a fourth blast panel pivotably mounted to the eighth structural member so that the fourth blast panel is adapted to pivot about the eighth structural member in response to the blast wave;

wherein, in the first configuration of the blast resistant shelter:

the third blast panel is detachably connected via a third fastener to a third portion of the blast resistant shelter and prevented from pivoting about the seventh structural member so that the third blast panel prevents, or at least reduces, air flow through the third airway; and the fourth blast panel is detachably connected via a fourth fastener to a fourth portion of the blast resistant shelter and prevented from pivoting about the eighth structural member so that the fourth blast panel prevents, or at least reduces, air flow through the fourth airway;

wherein, in the second configuration of the blast resistant shelter:

the third blast panel is detached via disconnection of the third fastener from the third portion of the blast resistant shelter and permitted to pivot about the seventh structural member so that air flow is permitted through the third airway; and the fourth blast panel is detached via disconnection of the fourth fastener from the fourth portion of the blast resistant shelter and permitted to pivot about the eighth structural member so that air flow is permitted through the fourth airway;

wherein the first portion of the blast resistant shelter to which the first blast panel is detachably connected via the first fastener in the first configuration comprises the second blast panel; and wherein the third portion of the blast resistant shelter to which the third blast panel is detachably connected via the third fastener in the first configuration comprises the fourth blast panel.

* * * * *